United States Patent
Fujimoto et al.

(10) Patent No.: US 7,294,184 B2
(45) Date of Patent: Nov. 13, 2007

(54) INK JET INK, INK JET RECORDING METHOD, INK CARTRIDGE, RECORDING UNIT, AND INK JET RECORDING APPARATUS

(75) Inventors: Kuniaki Fujimoto, Tokyo (JP); Shin-ichi Sato, Kanagawa (JP); Jun Yoshizawa, Tokyo (JP); Yoshihide Aikawa, Kanagawa (JP); Kunihiko Nakamura, Shizuoka (JP); Masanori Jinnou, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/321,552

(22) Filed: Dec. 30, 2005

(65) Prior Publication Data
US 2006/0109324 A1 May 25, 2006

Related U.S. Application Data

(63) Continuation of application No. PCT/JP2005/012710, filed on Jul. 4, 2005.

(30) Foreign Application Priority Data
Jul. 2, 2004 (JP) ............................ 2004-196450
Jun. 30, 2005 (JP) ............................ 2005-192193

(51) Int. Cl.
C09D 11/02 (2006.01)
B41J 2/01 (2006.01)

(52) U.S. Cl. ............................ 106/31.47; 106/31.58; 106/31.77; 106/31.86; 347/100

(58) Field of Classification Search ............ 106/31.58, 106/31.86, 31.47, 31.77; 347/100
See application file for complete search history.

(56) References Cited

U.S. PATENT DOCUMENTS 4,202,870 A    5/1980  Weber et al. ................ 423/630

(Continued)

FOREIGN PATENT DOCUMENTS
EP    0 682 088    11/1995

OTHER PUBLICATIONS

STN Registry File printout of the Structures of SURFYNOL 104PG50, SURFYNOL 82 and SURFYNOL 465, 3 pages, Nov. 1984.*

Primary Examiner—Helene Klemanski
(74) Attorney, Agent, or Firm—Fitzpatrick, Cella, Harper & Scinto

(57) ABSTRACT

Provided is an ink jet ink containing a coloring material having a buffer region in an ink use range, the ink jet ink being capable of suppressing the occurrence of the deterioration (dissolution) of a heating portion surface in contact with liquid; and the disconnection of wiring for applying a voltage to a heating portion even when long term continuous printing is performed. The ink jet ink is used for an ink jet recording apparatus equipped with a recording head having a heating portion surface in contact with liquid comprising a metal and/or a metal oxide. The ink jet ink contains a coloring material in a content (mass %) of 3 mass % or more with respect to the total mass of the ink jet ink. The coloring material is a colorant having a buffer region in an ink use range, and comprises a compound represented by the following general formula (I) and/or a compound represented by the following general formula (II)

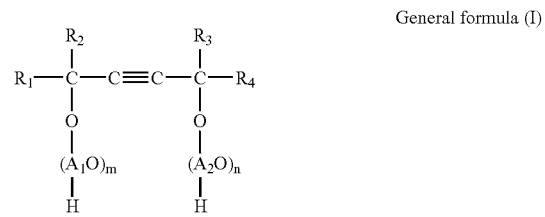

General formula (I)

$H(OCH_2CH_2)_pR_5.$    General formula (II)

9 Claims, 7 Drawing Sheets

U.S. PATENT DOCUMENTS

| | | | |
|---|---|---|---|
| 4,242,271 A | 12/1980 | Weber et al. | 260/448 |
| 4,248,852 A | 2/1981 | Wakabayashi et al. | 423/626 |
| 4,391,960 A | 7/1983 | Kleine et al. | 526/74 |
| 4,508,570 A * | 4/1985 | Fujii et al. | 106/31.43 |
| 4,723,129 A | 2/1988 | Endo et al. | 346/1.1 |
| 4,740,796 A | 4/1988 | Endo et al. | 346/1.1 |
| 5,091,009 A | 2/1992 | Nogami et al. | 106/287.1 |
| 5,221,497 A | 6/1993 | Watanabe et al. | 252/313.2 |
| 5,395,434 A | 3/1995 | Tochihara et al. | 106/22 R |
| 5,415,686 A | 5/1995 | Kurabayashi et al. | 106/26 R |
| 5,451,251 A | 9/1995 | Mafune et al. | 106/22 H |
| 5,482,545 A | 1/1996 | Aoki et al. | 106/22 K |
| 5,485,188 A | 1/1996 | Tochihara et al. | 347/100 |
| 5,599,386 A | 2/1997 | Sano et al. | 106/31.48 |
| 5,835,116 A | 11/1998 | Sato et al. | 347/98 |
| 5,933,164 A | 8/1999 | Sato et al. | 347/43 |
| 6,003,987 A | 12/1999 | Yamamoto et al. | 347/100 |
| 6,027,210 A | 2/2000 | Kurabayashi et al. | 347/100 |
| 6,186,615 B1 | 2/2001 | Sato et al. | 347/43 |
| 6,238,045 B1 | 5/2001 | Ono et al. | 347/96 |
| 6,254,669 B1 | 7/2001 | Lavery et al. | 106/31.47 |
| 6,322,209 B1 | 11/2001 | Sato et al. | 347/105 |
| 6,454,844 B1 * | 9/2002 | Kanaya | 106/31.48 |
| 6,460,988 B1 * | 10/2002 | Mafune et al. | 347/100 |
| 6,471,760 B1 | 10/2002 | Matsumoto et al. | 106/31.47 |
| 6,482,256 B1 * | 11/2002 | Kanaya et al. | 106/31.51 |
| 6,511,534 B1 | 1/2003 | Mishina et al. | 106/31.33 |
| 6,645,283 B1 * | 11/2003 | Matsumoto et al. | 106/31.47 |
| 6,698,876 B2 | 3/2004 | Sato et al. | 347/100 |
| 6,761,759 B2 * | 7/2004 | Oki et al. | 106/31.43 |
| 6,786,571 B2 * | 9/2004 | Fukumoto et al. | 347/43 |
| 6,929,361 B2 | 8/2005 | Matsumoto et al. | 347/100 |
| 6,976,755 B2 | 12/2005 | Sato et al. | 347/100 |
| 7,015,327 B2 | 3/2006 | Matsumoto et al. | 546/76 |
| 7,144,452 B2 | 12/2006 | Takayama et al. | 106/31.52 |
| 7,160,372 B2 | 1/2007 | Yoshizawa et al. | 106/31.47 |
| 2003/0010253 A1 * | 1/2003 | Oki et al. | 106/31.43 |
| 2003/0070580 A1 * | 4/2003 | Blease et al. | 106/31.27 |
| 2004/0174420 A1 | 9/2004 | Kitamura et al. | 347/100 |
| 2005/0005818 A1 | 1/2005 | Sato et al. | 106/31.27 |
| 2005/0131104 A1 | 6/2005 | Aikawa et al. | 523/160 |
| 2006/0102046 A1 | 5/2006 | Okamura et al. | 106/31.47 |
| 2006/0102048 A1 | 5/2006 | Nakamura et al. | 106/31.52 |
| 2006/0103705 A1 | 5/2006 | Yoshizawa et al. | 347/100 |
| 2006/0103706 A1 | 5/2006 | Aikawa et al. | 347/100 |
| 2006/0119683 A1 | 6/2006 | Yoshizawa et al. | 347/100 |
| 2006/0119685 A1 | 6/2006 | Yamashita et al. | 347/100 |
| 2006/0124027 A1 | 6/2006 | Sato | 106/31.6 |
| 2006/0125896 A1 | 6/2006 | Aikawa et al. | 347/100 |
| 2006/0146108 A1 | 7/2006 | Sato et al. | 347/100 |
| 2006/0152569 A1 | 7/2006 | Jinnou et al. | 347/105 |

FOREIGN PATENT DOCUMENTS

| | | | |
|---|---|---|---|
| EP | 1626069 | * | 2/2006 |
| EP | 1626070 | * | 2/2006 |
| JP | 57-44605 B | | 3/1982 |
| JP | 57-44605 | | 9/1982 |
| JP | 2881847 B | | 2/1992 |
| JP | 8-73791 | | 3/1996 |
| JP | 2803134 | | 7/1998 |
| JP | 2803134 B | | 7/1998 |
| JP | 10-250217 | | 9/1998 |
| JP | 2881847 | | 2/1999 |
| JP | 2000-109464 | | 4/2000 |
| JP | 2001-517209 | | 10/2001 |
| JP | 2002-332419 | | 11/2002 |
| JP | 2002-332419 A | | 11/2002 |
| JP | 2003-192930 | | 7/2003 |
| JP | 2003-192930 A | | 7/2003 |
| JP | 2003-253176 | | 9/2003 |
| JP | 2004-18689 | | 1/2004 |
| JP | 2004-91632 | | 3/2004 |
| JP | 2004-149600 | | 5/2004 |
| WO | WO 2004/104107 A1 | | 12/2004 |
| WO | WO 2004/104108 A1 | | 12/2004 |

* cited by examiner

INK JET INK, INK JET RECORDING METHOD, INK CARTRIDGE, RECORDING UNIT, AND INK JET RECORDING APPARATUS

This application is a continuation of International Application No. PCT/JP2005/012710, filed Jul. 4, 2005, which claims the benefit of Japanese Patent Application Nos. 2004-196450, filed Jul. 2, 2004 and 2005-192193, filed Jun. 30, 2005.

BACKGROUND OF THE INVENTION

1. Field of the Invention

The present invention relates to an ink jet ink excellent in print durability and the like, an ink jet recording method, an ink cartridge, a recording unit, and an ink jet recording apparatus.

2. Related Background Art

An ink jet recording method is a recording method involving applying a small ink droplet to any one of recording media such as plain paper and glossy media to form an image, and has become rapidly widespread owing to a reduction in its cost and an improvement in its recording rate. With the rapid spread of a digital camera in addition to an improvement in quality of an image recorded by this method, the method has been generally used as a method of outputting a photographic image comparable to silver halide photograph.

In recent years, image quality has undergone an improvement never possible before owing to, for example, an extreme reduction in size of an ink droplet and an improvement of color ranges involved in the introduction of multicolor inks. Meanwhile, there have been growing demands for a coloring material and ink, so more stringent properties have been required in terms of an improvement of coloring property and reliability such as sticking property or ejection stability.

As compared to silver halide photograph, the ink jet recording method is problematic in terms of, for example, the image storage stability of the resultant recorded article. In general, the recorded article obtained by means of the ink jet recording method is inferior in image storage stability to silver halide photograph, and involves the emergence of a problem in that a coloring material on the recorded article is apt to deteriorate to cause a change in color tone of an image and the color fading of the image when the recorded article is exposed to light, humidity, heat, an environmental gas present in the air, or the like for a long period of time. A large number of proposals have been conventionally made with a view to solving the above problem.

For example, there has been proposed the use of a coloring material having a specific anthrapyridone structure to improve fastness properties (see, for example, JP 2002-332419 A and JP 2003-192930 A). The fastness properties of a recorded article obtained by means of an ink containing the above dye are very excellent.

However, when the ink containing the above coloring material is used as an ink applicable to an ink jet recording apparatus, it has been difficult to secure reliability in some cases. In particular, an ink jet recording method involving applying thermal energy to ink to eject the ink may involve the occurrence of a problem in that kogation occurs at the heating portion of a recording head (the heating portion itself when the heating portion is in direct contact with a liquid, or a protective layer when the heating portion has at least one protective layer on its surface) or a problem in that long term continuous printing results in the deterioration (dissolution) of a heating portion surface in contact with liquid; or the disconnection of wiring for applying a voltage to the heating portion.

The inventors of the present invention have studied a cause for such phenomenon as described above occurring in an ink containing the above coloring material excellent in fastness properties. As a result, they have found that the phenomenon depends on a specific site in a coloring material structure and a specific ion in the ink. The specific site is for example a substituent that easily releases a hydrogen ion such as a hydroxyl group bonded to a triazine ring, and the specific ion is for example a hydroxide ion.

When a coloring material having, in its structure, a substituent that easily releases a hydrogen ion is turned into an aqueous solution (ink), the ink may have a buffer region (region maintaining a approximately constant hydrogen ion concentration). The ink having a buffer region has advantages such as an ability to suppress the decomposition of a coloring material because the ink maintains its pH at a constant level even when the ink is left in various environments at the time of, for example, materials flow.

However, as described above, when long term continuous printing is performed by means of an ink having a buffer region in an ink jet recording apparatus having a heating portion containing at least a metal and/or a metal oxide, the metal and/or the metal oxide in the surface at which the heating portion in contact with a liquid and a hydroxide ion react with each other every time the ink is ejected (thermal energy is applied to the ink). As a result, problems such as the deterioration (dissolution) of the heating portion surface in contact with liquid and the disconnection of wiring for applying a voltage to the heating portion occur.

One possible approach to solving the above problems is to reduce the coloring material concentration in the ink, for example, to reduce the coloring material content to be lower than 3%. However, a reduction in dye concentration in ink may make it impossible to provide a recorded article having a high density.

The inventors of the present invention have solved the above problems by contriving the composition of ink (such as the incorporation of a specific compound into the ink) to find a method with which the coloring material having a substituent that easily releases a hydrogen ion can be successfully used. The present invention has been made on the basis of this finding.

SUMMARY OF THE INVENTION

Therefore, an object of the present invention is to provide an ink jet ink containing a coloring material having a buffer region in an ink use range, the ink jet ink being capable of suppressing the occurrence of the deterioration (dissolution) of a heating portion surface in contact with liquid; and the disconnection of wiring for applying a voltage to a heating portion even when long term continuous printing is performed.

Another objects of the present invention are to provide an ink jet recording method, an ink cartridge, a recording unit, and an ink jet recording apparatus each using the ink jet ink.

The above objects are achieved by the present invention described below. That is according to one aspect of the present invention, there is provided an ink jet ink to be used for an ink jet recording apparatus equipped with a recording head having a heating portion surface in contact with liquid comprising at least a metal and/or a metal oxide, comprising a coloring material in a content (mass %) of 3 mass % or more with respect to the total mass of the ink jet ink, in which the coloring material is a coloring material having a buffer region in an ink use range, and in which the ink further comprises at least a compound represented by the following general formula (I) and/or a compound represented by the following general formula (II).

General formula (I)

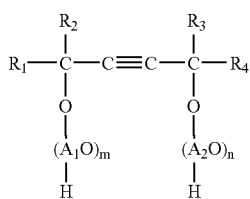

(In the general formula (I): $R_1$, $R_2$, $R_3$, and $R_4$ each independently represent an alkyl group having 1 to 6 carbon atoms which may be branched; $A_1O$ and $A_2O$ each independently represent an ethylene oxide group, a propylene oxide group, or a copolymerized structure of an ethylene oxide group and a propylene oxide group; and m and n each independently represent an integer more than 0.)

General formula (II)

$$H(OCH_2CH_2)_pR_5$$

(In the general formula (II): $R_5$ represents a hydroxyl group or an alkyl group having 4 or more carbon atoms which may be branched; and p represents an integer of 4 or more.)

According to another aspect of the present invention, there is provided an ink jet ink to be used for an ink jet recording apparatus equipped with a recording head having a heating portion surface in contact with liquid comprising at least a metal and/or a metal oxide, comprising a coloring material in a content (mass %) of 3 mass % or more with respect to the total mass of the ink jet ink, in which the coloring material is a compound represented by the following general formula (III) or a salt thereof, and in which the ink further comprises at least a compound represented by the following general formula (I) and/or a compound represented by the following general formula (II).

General formula (I)

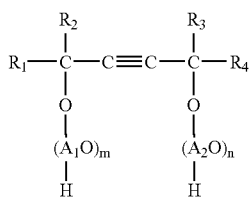

(In the general formula (I): $R_1$, $R_2$, $R_3$, and $R_4$ each independently represent an alkyl group having 1 to 6 carbon atoms which may be branched; $A_1O$ and $A_2O$ each independently represent an ethylene oxide group, a propylene oxide group, or a copolymerized structure of an ethylene oxide group and a propylene oxide group; and m and n each independently represent an integer more than 0.)

General formula (II)

$$H(OCH_2CH_2)_pR_5$$

(In the general formula (II): $R_5$ represents a hydroxyl group or an alkyl group having 4 or more carbon atoms which may be branched; and p represents an integer of 4 or more.)

General formula (III)

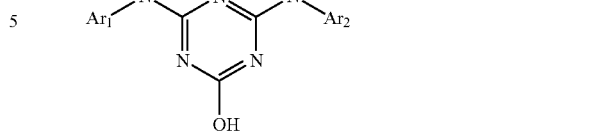

(In the general formula (III): $Ar_1$ represents a benzene ring which may be substituted, a naphthyl group which may be substituted, or a group represented by the following general formula (IV); and $Ar_2$ represents a benzene ring which may be substituted or a naphthyl group which may be substituted.)

General formula (IV)

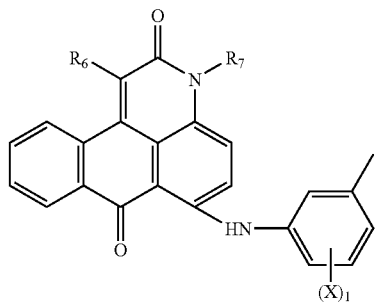

(In the general formula (IV): $R_6$ represents a hydrogen atom, an alkoxy carbonyl group, or a benzoyl group which may be substituted; $R_7$ represents a hydrogen atom, an alkyl group, a hydroxy lower alkyl group, a cyclohexyl group, a monoalkylaminoalkyl or dialkylaminoalkyl group, or a cyano lower alkyl group; X represents a carboxylic acid group or a salt thereof, or a sulfonic group or a salt thereof; and l represents 1 or 2.)

According to another aspect of the present invention, there is provided an ink jet ink to be used for an ink jet recording apparatus equipped with a recording head having a heating portion surface in contact with liquid comprising at least a metal and/or a metal oxide, comprising a coloring material in a content (mass %) of 3 mass % or more with respect to the total mass of the ink jet ink, in which the coloring material is a compound represented by the following general formula (V) or a salt thereof, and in which the ink further comprises at least a compound represented by the following general formula (I) and/or a compound represented by the following general formula (II).

General formula (I)

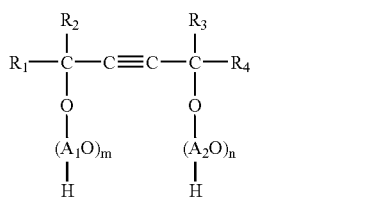

(In the general formula (I): $R_1$, $R_2$, $R_3$, and $R_4$ each independently represent an alkyl group having 1 to 6 carbon atoms which may be branched; $A_1O$ and $A_2O$ each independently represent an ethylene oxide group, a propylene oxide group, or a copolymerized structure of an ethylene oxide group and a propylene oxide group; and m and n each independently represent an integer more than 0.)

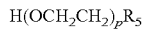   General formula (II)

(In the general formula (II): $R_5$ represents a hydroxyl group or an alkyl group having 4 or more carbon atoms which may be branched; and p represents an integer of 4 or more.)

General formula (V)

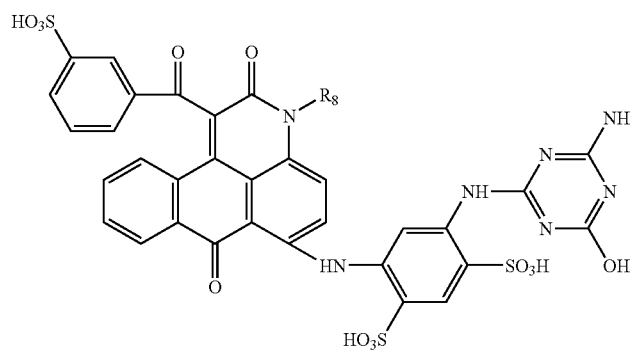

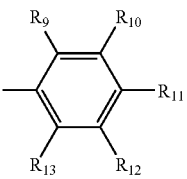

(In the general formula (V): $R_8$ represents a hydrogen atom, an alkyl group, a hydroxy lower alkyl group, a cyclohexyl group, a monoalkylaminoalkyl or dialkylaminoalkyl group, or a cyano lower alkyl group; and $R_9$, $R_{10}$, $R_{11}$, $R_{12}$, and $R_{13}$ each independently represent a hydrogen atom, an alkyl group having 1 to 8 carbon atoms, or a carboxyl group (provided that $R_9$, $R_{10}$, $R_{11}$, $R_{12}$, and $R_{13}$ cannot simultaneously represent hydrogen atoms).)

According to another aspect of the present invention, there is provided an ink jet recording method, comprising ejecting an ink by an ink jet method, in which the ink is the ink jet ink having the above constitution.

According to another aspect of the present invention, there is provided an ink cartridge, including an ink storage portion for storing ink, in which the ink is the ink jet ink having the above constitution.

According to another aspect of the present invention, there is provided a recording unit, comprising an ink storage portion for storing ink and a recording head for ejecting the ink, in which the ink is the ink jet ink having the above constitution.

According to another aspect of the present invention, there is provided an ink jet recording apparatus, comprising an ink storage portion for storing ink and a recording head for ejecting the ink, in which the ink is the ink jet ink having the above constitution.

According to the present invention, there can be provided an ink jet ink containing a coloring material having a buffer region in an ink use range, the ink jet ink being capable of suppressing the occurrence of the deterioration (dissolution) of a heating portion surface in contact with liquid; and the disconnection of wiring for applying a voltage to a heating portion even when long term continuous printing is performed.

According to the present invention, there can also be provided an ink jet recording method, an ink cartridge, a recording unit, and an ink jet recording apparatus each using the ink jet ink.

DESCRIPTION OF THE PREFERRED EMBODIMENTS

Figure 1:
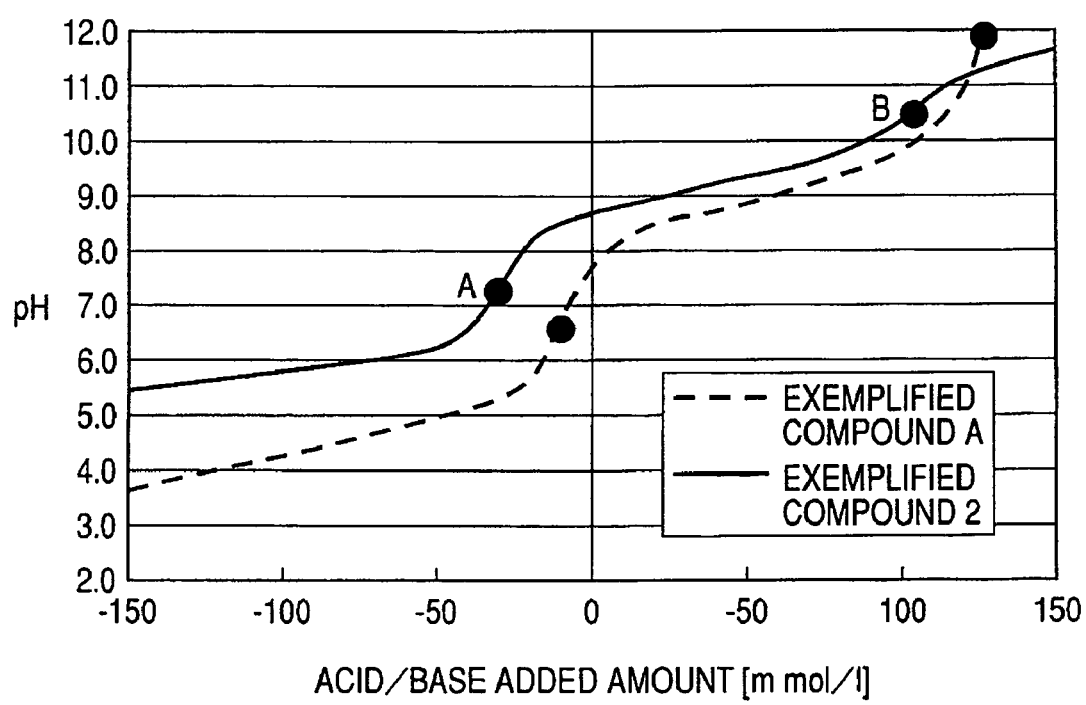
FIG. 1 shows titration curves of Exemplified Compound A and Exemplified Compound 2.

Hereinafter, the present invention will be described in more detail by way of preferred embodiments.

In the present invention, when a coloring material is a salt, the salt is dissociated into ions in ink, but this state is represented by using the phrase "contains a salt" for convenience.

When the ink of the present invention is used as ink jet ink, there are a large number of factors for causing the pH of the ink to change. The phrase "having a buffer region in an ink use range" as used herein refers to a state where the pH of the ink at the time of use of the ink is within the buffer region of a coloring material in the ink. Specific examples of the factors for causing the pH to change include the storage for a certain time period in various environments and the evaporation of a volatile substance from ink stored in an ink cartridge.

In addition, the occurrence of the deterioration (dissolution) of a heating portion surface in contact with liquid; and the disconnection of wiring for applying a voltage to a heating portion are phenomena found in the case where an ink containing a coloring material having a buffer region in an ink use range in a content (mass %) of 3 mass % or more with respect to the total mass of the ink is used to perform long term continuous printing.

<Ink>

(Compound Represented by General Formula (I)/Compound Represented by General Formula (II))

In the present invention, a coloring material having a buffer region in an ink use range and a compound represented by the following general formula (I) and/or a compound represented by the following general formula (II) are combined to be incorporated into ink jet ink. As a result, at least one of the compounds represented by the general formula (I) and the compound represented by the general formula (II) preferentially adsorbs to the heating portion surface in contact with liquid, to thereby prevent a hydroxide ion in the ink from adsorbing to the heating portion surface in contact with liquid. As a result, the occurrence of the deterioration (dissolution) of the heating portion surface in contact with liquid, and the disconnection of wiring for applying a voltage to a heating portion can be suppressed.

(Compound Represented by General Formula (I))

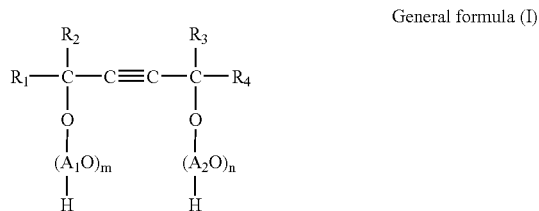

General formula (I)

(In the general formula (I): $R_1$, $R_2$, $R_3$, and $R_4$ each independently represent an alkyl group having 1 to 6 carbon atoms which may be branched; $A_1O$ and $A_2O$ each independently represent an ethylene oxide group, a propylene oxide group, or a copolymerized structure of an ethylene oxide group and a propylene oxide group; and m and n each independently represent an integer more than 0.)

In the present invention, it is preferable that $3 \leq n+m \leq 30$ in the general formula (I); and the content (mass %) of the compound represented by the general formula (I) be 0.25 mass % or more and 5.0 mass % or less with respect to the total mass of the ink. When n+m<3, the solubility of the compound represented by the general formula (I) into the ink is apt to be insufficient, so it may not be dissolved. In addition, when n+m>30, ejection at a print start position upon recording of an image becomes unstable, so a high quality recorded article may not be obtained. Even when $3 \leq n+m \leq 30$ in the general formula (I), if the content (mass %) of the compound represented by the general formula (I) is less than 0.25 mass %, the surface tension of the ink is apt to be high, so it may be difficult to fill an ink cartridge having a mechanism for generating a negative pressure with the ink. In addition, when the content is more than 5.0 mass %, ejection at a print start position upon recording of an image becomes unstable, so a high quality recorded article may not be obtained.

In the present invention, it is particularly preferable that $5 \leq n+m \leq 15$ in the general formula (I); and the content (mass %) of the compound represented by the general formula (I) be 1.0 mass % or more and 3.0 mass % or less with respect to the total mass of the ink. With the constitution, the occurrence of the deterioration (dissolution) of a heating portion surface in contact with liquid; and the disconnection of wiring for applying a voltage to a heating portion can be suppressed, and ejection at a print start position upon recording of an image becomes stable, so a recorded article with improved quality can be obtained.

(Compound Represented by General Formula (II))

$$H(OCH_2CH_2)_pR_5 \qquad \text{General formula (II)}$$

(In the general formula (II): $R_5$ represents a hydroxyl group or an alkyl group having 4 or more carbon atoms which may be branched; and p represents an integer of 4 or more.)

In the present invention, it is preferable that $4 \leq p \leq 38$ in the general formula (II); and the content (mass %) of the compound represented by the general formula (II) be 3.0 mass % or more and 10.0 mass % or less with respect to the total mass of the ink. The reason for this is as follows. When p<4, the deterioration (dissolution) of a heating portion surface in contact with liquid can be suppressed to some extent, but the deterioration (dissolution) is apt to proceed. In this case, the disconnection of wiring for applying a voltage to a heating portion does not occur, but a phenomenon as a precursor for the disconnection, that is, the dot mis-alignment of printing may occur. In addition, when p>38, insufficient ejection may occur. Even when $4 \leq p \leq 38$ in the general formula (II), if the content (mass %) of the compound represented by the general formula (II) is less than 3.0 mass %, the effects of the present invention may not be sufficiently obtained. In addition, when the content (mass %) of the compound represented by the general formula (II) is more than 10.0 mass %, the viscosity of the ink increases, so reliability such as ejection property may not be sufficiently secured when the ink is used as ink jet ink.

The compound represented by the general formula (I) and the compound represented by the general formula (II) can be used in combination. A preferable range for the content in the ink in this case is the same as that in the case where each of the compounds represented by the general formula (I) and the compound represented by the general formula (II) is used alone. In addition, the ratio of the content of the compound represented by the general formula (I) and the content of the compound represented by the general formula (II) is not particularly limited, and may be in an arbitrary range.

(Mechanism with which Deterioration of Heating Portion Surface in Contact with Liquid and Disconnection of Wiring for Applying Voltage to Heating Portion Occur)

The mechanism that an ink jet ink containing a coloring material having a buffer region in an ink use range (which may hereinafter be simply referred to as the "ink") causes the deterioration (dissolution) of a heating portion surface in contact with liquid and the disconnection of wiring for applying voltage to a heating portion has not revealed in detail, but the inventors of the present invention consider the mechanism to be as follows.

When an ink containing a coloring material having no buffer region in an ink use range is used, only a trace amount of hydroxide ions is present in the ink, so the amount of hydroxide ions adsorbing to a heating portion surface in contact with liquid containing at least a metal and/or a metal oxide is small. Therefore, upon ejection of the ink, that is, upon application of a voltage to a heating portion to heat the heating portion, nearly no reaction occurs between a hydroxide ion and the heating portion surface in contact with liquid. As a result, the deterioration (dissolution) of the heating portion surface in contact with liquid and the disconnection of wiring for applying voltage to the heating portion hardly occur.

In contrast, when an ink containing a coloring material having a buffer region in an ink use range is used, the amount of hydroxide ions present in the ink is more than that of an ink containing a coloring material having no buffer region in an ink use range, so the amount of hydroxide ions adsorbing to a heating portion surface in contact with liquid containing at least a metal and/or a metal oxide is also large. Therefore, upon ejection of the ink, that is, upon application of a voltage to a heating portion to heat the heating portion, a reaction occurs between a hydroxide ion adsorbing to the heating portion surface in contact with liquid and the heating portion surface in contact with liquid, so the heating portion surface in contact with liquid dissolves. As a result, the hydroxide ion concentration of the ink near the heating portion surface in contact with liquid reduces. Since the coloring material in the ink has a buffer region in an ink use range, an action of maintaining an approximately constant hydroxide ion concentration is exerted on a change in hydroxide ion concentration of the ink, so the hydroxide ion concentration of the ink increases. Hydroxide ions generated as a result of the increase adsorb to the heating portion surface in contact with liquid in the same manner as that mentioned above. Then, the same phenomenon as that described above occurs, and upon ejection of the ink, that is, upon application of a voltage to the heating portion to heat the heating portion, a reaction occurs between a hydroxide ion adsorbing to the heating portion surface in contact with liquid and the heating portion surface in contact with liquid, so the heating portion surface in contact with liquid further dissolves.

Such reaction as described above is repeated every time when the ink is ejected, that is, a voltage is applied to the heating portion to heat the heating portion. Accordingly, the use of an ink containing a coloring material having a buffer region in an ink use range for an ink jet recording apparatus equipped with a recording head having a heating portion surface in contact with liquid containing at least a metal and/or a metal oxide causes the deterioration (dissolution) of the heating portion surface in contact with liquid and the disconnection of wiring for applying a voltage to a heating portion to occur.

(Colorant)

A compound represented by the general formula (III) or a salt thereof, or a compound represented by the general formula (V) or a salt thereof is preferably used as a coloring material of the ink according to the present invention. Of those, the compound represented by the general formula (V) or the salt thereof is particularly preferably used. It should be noted that each of the compound represented by the general formula (III) or a salt thereof and the compound represented by the general formula (V) or the salt thereof may be used alone, or a plurality of them may be used in combination.

The content (mass %) of the coloring material in the ink jet ink according to the present invention must be 3 mass % or more with respect to the total mass of the ink. The upper limit for the content (mass %) of the coloring material is preferably 10.0 mass % or less with respect to the total mass of the ink. When the content exceeds 10.0 mass %, good ink jet properties may not be obtained. For example, sticking recovery property (the performance with which recovery is performed through a recovery operation such as suction when it sticks to a recording head) may not be obtained.

(Compound Represented by General Formula (III) or a Salt Thereof)

A compound represented by the following general formula (III) or a salt thereof is preferably used as the coloring material of the ink according to the present invention.

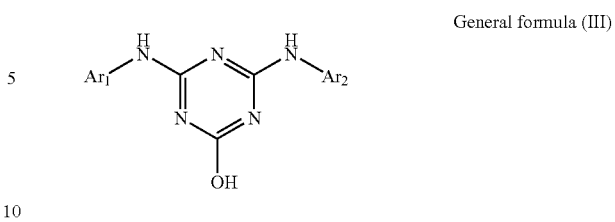

General formula (III)

(In the general formula (III): $Ar_1$ represents a benzene ring which may be substituted, a naphthyl group which may be substituted, or a group represented by the following general formula (IV); and $Ar_2$ represents a benzene ring which may be substituted or a naphthyl group which may be substituted.)

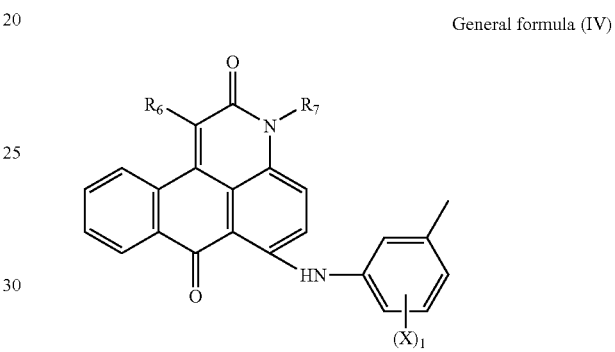

General formula (IV)

(In the general formula (IV): $R_6$ represents a hydrogen atom, an alkoxy carbonyl group, or a benzoyl group which may be substituted; $R_7$ represents a hydrogen atom, an alkyl group, a hydroxy lower alkyl group, a cyclohexyl group, a monoalkylaminoalkyl or dialkylaminoalkyl group, or a cyano lower alkyl group; X represents a carboxylic acid group or a salt thereof, or a sulfonic group or a salt thereof; and l represents 1 or 2.)

An ink containing the compound represented by the general formula (III) or the salt thereof has a buffer region in the range of pH 8.0 to 10.0. As described above, an ink having a buffer region in the pH range causes the deterioration (dissolution) of a heating portion surface in contact with liquid and the disconnection of wiring for applying a voltage to a heating portion to occur. Incorporating the compound represented by the general formula (I) and/or the compound represented by the general formula (II) into ink has a suppressing effect on an attack by a hydroxide ion to a heating portion surface in contact with liquid and a protecting effect on the heating portion surface in contact with liquid, so the occurrence of: the deterioration (dissolution) of the heating portion surface in contact with liquid; and the disconnection of wiring for applying a voltage to a heating portion is suppressed.

Exemplified Compounds 1 to 4 below are preferable examples of the compound represented by the general formula (III) or the salt thereof. In each of the following exemplified compounds, M represents an alkali metal. In the present invention, out of the alkali metals, Na, Li, and K are particularly preferable. Of course, the present invention is not limited to the following compounds.

Exemplified Compounds 1 to 4

Exemplified Compound 1

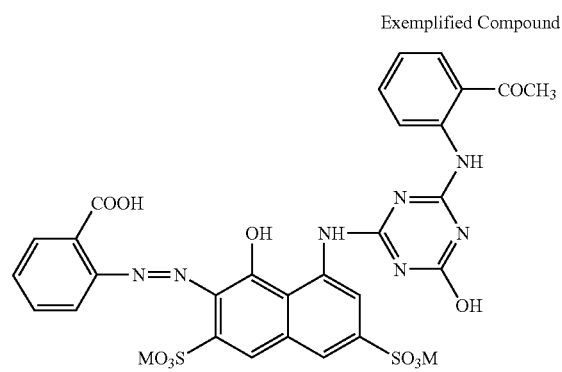

Exemplified Compound 2

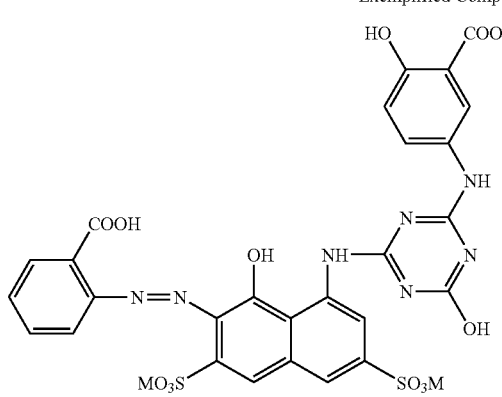

Exemplified Compound 3

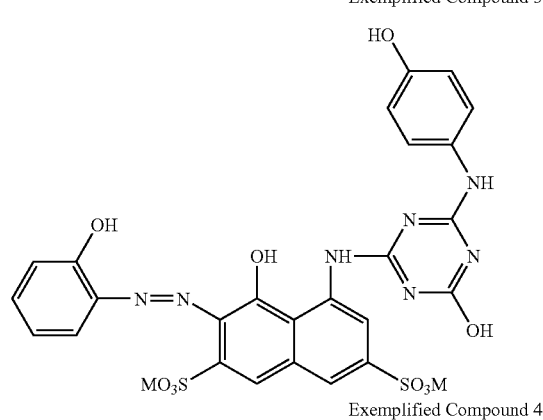

Exemplified Compound 4

(Compound Represented by General Formula (V) or a Salt Thereof)

A compound represented by the following general formula (V) or a salt thereof is more preferably used as the coloring material of the ink according to the present invention. This is because the compound represented by the general formula (V) or the salt thereof can also improve image storage stability such as gas resistance.

General formula (V)

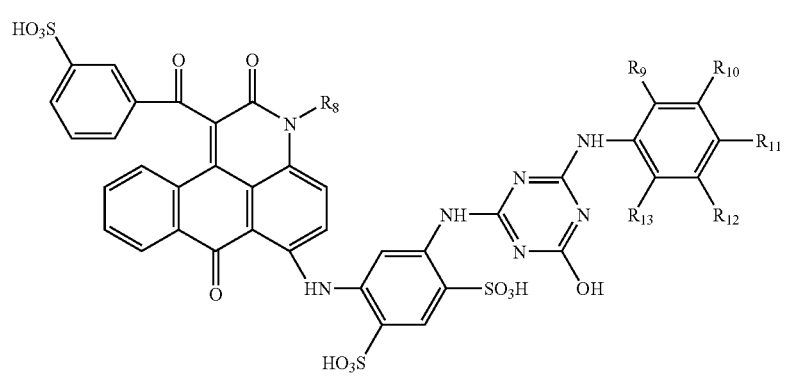

(In the general formula (V): $R_8$ represents a hydrogen atom, an alkyl group, a hydroxy lower alkyl group, a cyclohexyl group, a monoalkylaminoalkyl or dialkylaminoalkyl group, or a cyano lower alkyl group; and $R_9$, $R_{10}$, $R_{11}$, $R_{12}$, and $R_{13}$ each independently represent a hydrogen atom, an alkyl group having 1 to 8 carbon atoms, or a carboxyl group (provided that $R_9$, $R_{10}$, $R_{11}$, $R_{12}$, and $R_{13}$ cannot simultaneously represent hydrogen atoms).)

Exemplified Compounds 5 to 11 below are preferable examples of the compound represented by the general formula (V) or the salt thereof. Of course, the present invention is not limited to the following compounds.

Exemplified Compounds 5 to 11

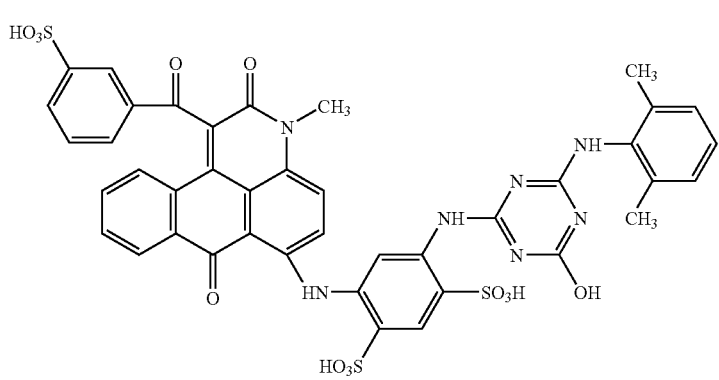

Exemplified compound 5

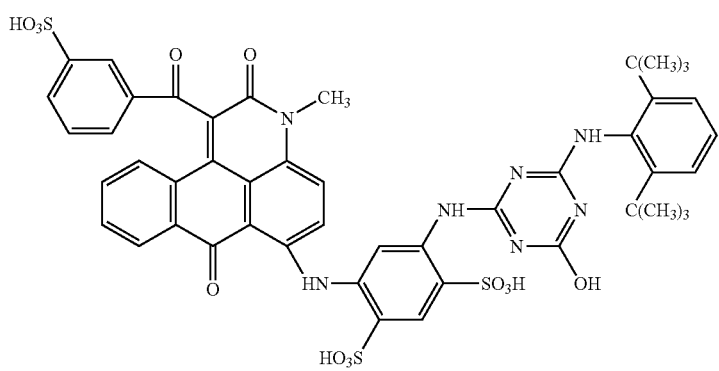

Exemplified compound 6

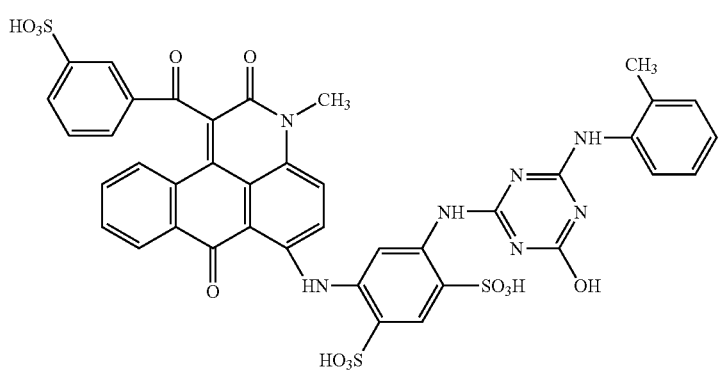

Exemplified compound 7

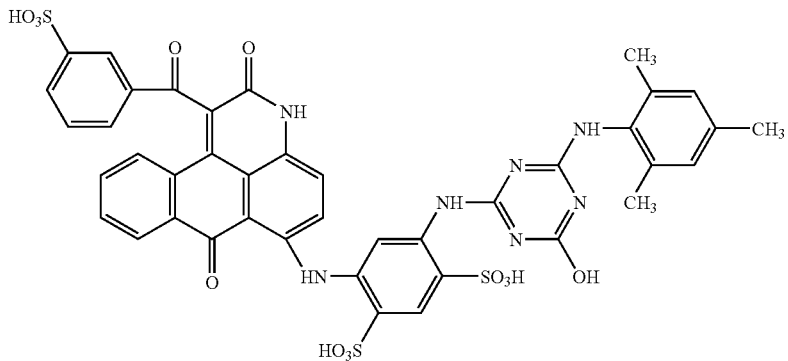
Exemplified compound 8
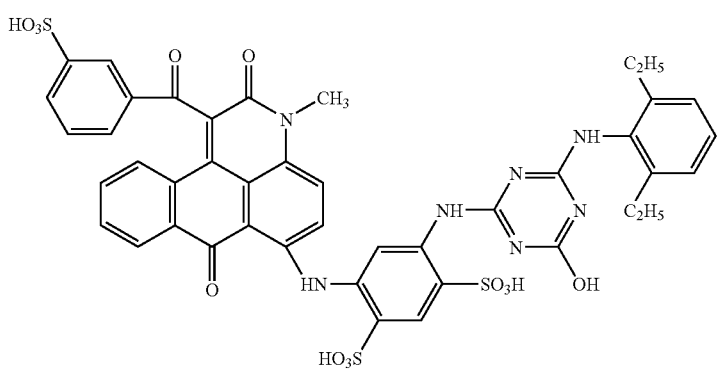
Exemplified compound 9
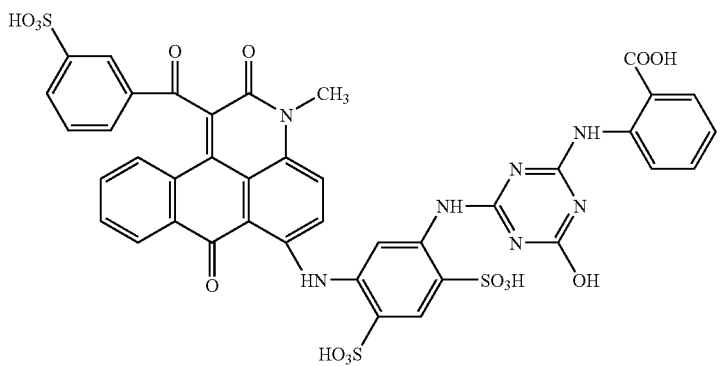
Exemplified compound 10
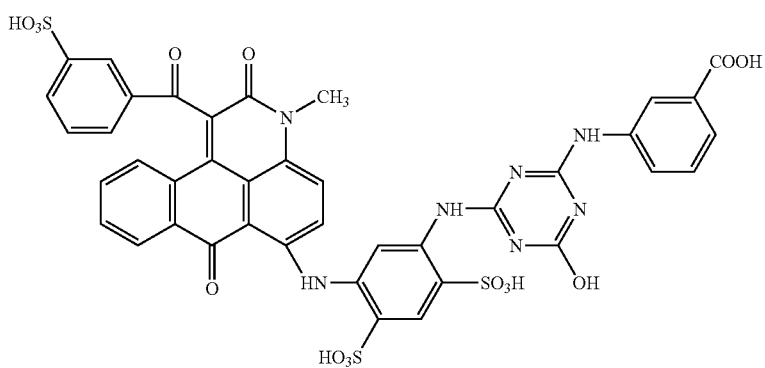
Exemplified compound 11

Exemplified Compound A below which is a sodium salt of Exemplified Compound 10 out of the above exemplified compounds is particularly preferably used.

Exemplified Compound A

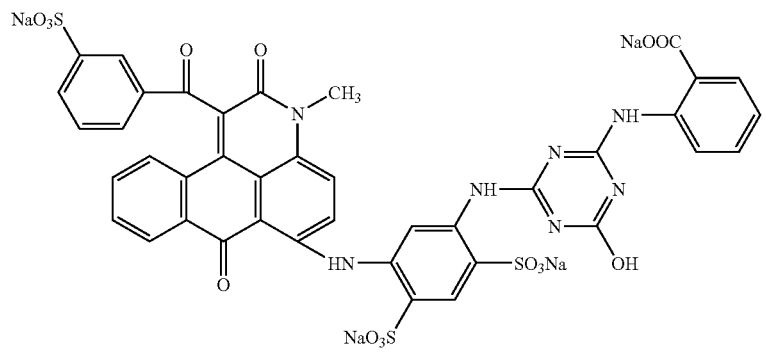

[Method of Testing Coloring Material]

The coloring material to be used in the present invention can be tested by following methods (1) to (3) each of which involves the use of high performance liquid chromatography (HPLC).
(1) Retention time of a peak
(2) Maximum absorption wavelength in the peak of (1)
(3) M/Z (posi, nega) of mass spectrum in the peak of (1)

Analysis conditions for high performance liquid chromatography are as shown below.

An ink solution diluted 100 times with pure water is analyzed by means of high performance liquid chromatography under the following conditions to measure the retention time of a peak and the maximum absorption wavelength of the peak.

Column: Symmetry C18 2.1 mm×150 mm
Column temperature: 40° C.
Flow rate: 0.2 ml/min
PDA: 210 nm to 700 nm
Mobile phase and gradient condition: Table 1

TABLE 1

|  | 0-15 min | 5-40 min | 40-45 min |
|---|---|---|---|
| A Water | 85% | 85% → 0% | 0% |
| B Methanol | 10% | 10% → 95% | 95% |
| C 0.2-mol/l aqueous solution of ammonium acetate | 5% | 5% | 5% |

In addition, analysis conditions for mass spectrum are as shown below.

The mass spectrum of the resultant peak is measured under the following conditions, and the most strongly detected M/Z is measured for each of posi and nega.

Ionization Method

| ESI | Capillary voltage | 3.5 kV |
|---|---|---|
|  | Desolvating gas | 300° C. |
|  | Ion source temperature | 120° C. |

-continued

| Detector | posi 40 V 200-1,500 amu/0.9 sec |
|---|---|
|  | nega 40 V 200-1,500 amu/0.9 sec |

Table 2 shows the values of the retention time, maximum absorption wavelength, M/Z(posi), and M/Z(nega) of Exemplified Compound A. When a coloring material has a value shown in Table 2, the coloring material can be determined to be a coloring material used in the present invention.

TABLE 2

| Retention time | Maximum absorption wavelength | M/Z | |
|---|---|---|---|
| [min] | [nm] | Posi | Nega |
| 21-23 | 530-550 | 941-944 | 469-471 |

(Buffer Region)

The term "buffer region" as used herein refers to a pH region in which a solution maintains an approximately constant hydrogen ion concentration in spite of some degree of addition or disappearance of an acid or base. A titration curve shown in FIG. 1 having the axis of abscissa indicating the amount of an acid or base to be added to a solution and the axis of ordinate indicating the pH of the solution shows the measurements of a change in pH of the solution. In FIG. 1, the buffer region corresponds to a region around a region showing a small change in pH (having two points of inflection in the titration curve as boundaries). For example, the buffer region of Exemplified Compound 2 corresponds to the range from A to B in FIG. 1.

The phrase "having a buffer region in an ink use range" as used herein of course includes the initial pH after the preparation of ink. The phrase also includes the case in which the pH of ink is induced to enter a buffer region owing to the changes of the ink itself and a coloring material itself during the use of the ink.

FIG. 1 shows the acid-base titration curves of Exemplified Compound A and Exemplified Compound 2. In FIG. 1, the axis of ordinate indicates the pH of an aqueous solution of a coloring material, and the axis of abscissa indicates the amount of an acid or base added. In the axis of abscissa, a number more than 0 indicates the amount of an aqueous solution of sodium hydroxide as a base, and a number lower than 0 indicates the amount of an aqueous solution of nitric acid as an acid.

A specific procedure for determining the titration curve of an aqueous solution of a coloring material is as follows. 2 litters of a 10-mass % aqueous solution of a coloring material are prepared, and the initial pH is measured. Then, the pH of the 10-mass % aqueous solution of the coloring material is adjusted to 7.0 with an acid or base. The 10-mass % aqueous solution of the coloring material with its pH adjusted to 7 is divided into two equal portions each having a volume of about 1 liter. An acid is added to one of the 1-liter portions of the 10-mass % aqueous solution of the coloring material with its pH adjusted to 7.0, and a base is added to the other 1-liter portion of the 10-mass % aqueous solution of the coloring material with its pH adjusted to 7, to thereby measure the pH of each of the aqueous solutions of the coloring material.

FIG. 1 shows the titration curves of Exemplified Compound A and Exemplified Compound 2 determined by means of the above procedure. FIG. 1 shows that Exemplified Compound A has a buffer region of pH 6.5 to 11.8 (both inclusive) and Exemplified Compound 2 has a buffer region of pH 7.3 to 10.5 (both inclusive).

(Aqueous Medium)

An ink composition of the present invention can use water or an aqueous medium which is a mixed solvent of water and any one of various water-soluble organic solvents.

There is no particular limitation concerning the water-soluble organic solvents as long as they are water-soluble, and, for example, an alcohol, a nitrogen-containing polar solvent, or a sulfur-containing polar solvent can be used. Specific examples thereof include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; and polyhydric alcohols such as trimethylolpropane and trimethylolethane. Of course, the present invention is not limited to those compounds. Each of those water-soluble organic solvents may be used alone, or two or more of them may be used as a mixture.

The content of such water-soluble organic solvent is preferably 5 mass % to 90 mass %, or more preferably 10 mass % to 50 mass % with respect to the total mass of ink. The reason for the above is as follows. When the content is lower than the range, reliability such as ejection property may deteriorate when used for ink jet ink, while when the content is more than the range, insufficient ink supply due to an increase in viscosity of ink may occur.

Deionized water (ion-exchanged water) is preferably used as water. The water content is preferably 10 mass % to 90 mass % with respect to the total mass of ink.

(Other Additive)

In addition, in the present invention, various additives such as a surfactant, a pH adjustor, a rust inhibitor, an antiseptic, an antifungal agent, an antioxidant, an anti-reducing agent, an evaporation accelerator, a chelating agent, and a water-soluble polymer may be incorporated as required.

<Recording Medium>

Any recording medium can be used for forming images by means of the ink of the present invention as long as recording is performed by applying the ink to the recording medium.

The present invention is applicable to a recording medium in which a coloring material such as a pigment is adsorbed to a fine particle forming a porous structure in an ink-receiving layer and an image is formed from at least the fine particles with the coloring material absorbed thereto, and is particularly suitable for the case where an ink jet method is used. Such an ink jet recording medium is preferably of a so-called absorption type in which ink is absorbed by a gap formed in an ink-receiving layer on a support.

An absorption type ink-receiving layer is constituted as a porous layer mainly composed of fine particles and containing a binder and any other additive as required. Specific examples of the fine particles include: inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them may be used. Examples of a binder that is suitably used include a water-soluble polymer and latex. Examples of an available binder include: polyvinyl alcohol or a modified product thereof; starch or a modified product thereof; gelatin or a modified product thereof; gum arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional group-modified polymer latex, and an ethylene-vinyl acetate copolymer; polyvinyl pyrrolidone; maleic anhydride or a copolymer thereof; and an acrylate copolymer. Two or more kinds of them can be used in combination as required. In addition, an additive may be used, and examples of an additive to be used as required include a dispersant, a thickener, a pH adjustor, a lubricant, a fluidity denaturing agent, a surfactant, a defoaming agent, a releasing agent, a fluorescent dye, a UV absorber, and an antioxidant.

In particular, a recording medium having formed thereon an ink-receiving layer mainly composed of fine particles having an average particle size of 1 μm or less is preferably used in the present invention. Particularly preferable examples of the fine particles include silica fine particles and aluminum oxide fine particles. Preferable silica fine particles are silica fine particles typified by colloidal silica. Colloidal silica, which itself is available from the market, is particularly preferably that described in JP 2803134 B or JP 2881847 B. Preferable aluminum oxide fine particles are alumina hydrate fine particles and the like. An alumina hydrate represented by the following general formula can be exemplified as one example of such alumina hydrate fine particles.

(In the formula, n represents an integer of 1, 2, or 3, and m represents a value of 0 to 10, or preferably 0 to 5; provided, however, that m and n cannot be simultaneously 0. m may be or may not be an integer because $mH_2O$ also represents an aqueous phase that can desorb and is not involved in the formation of an $mH_2O$ crystal lattice in many cases. In addition, heating such kind of material may cause m to reach 0.)

An alumina hydrate can be produced by means of a conventionally known method such as: the hydrolysis of aluminum alkoxide or sodium aluminate described in U.S. Pat. No. 4,242,271 or U.S. Pat. No. 4,202,870; or a method involving adding an aqueous solution of sodium sulfate, aluminum chloride, or the like to an aqueous solution of sodium aluminate or the like to perform neutralization described in JP 57-44605 B.

The recording medium preferably has a support for supporting the above-described ink-receiving layer. Any support can be used without any particular limitation as long as its ink-receiving layer can be formed of the above-described porous fine particles and the support provides rigidity such that the support can be conveyed by a conveying mechanism of an ink jet printer or the like. Specific examples thereof include a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; and resin-coated paper (for example, RC paper) having, on at least one side of a base paper, a polyolefin resin coating layer added with a white pigment or the like.

<Ink Set>

The ink of the present invention can be preferably used in combination with any other ink to provide an ink set. The term "ink set" as used herein refers to a state where the ink of the present invention is used in combination with any other ink such as cyan ink, magenta ink, yellow ink, or black ink. The other ink that can be used in combination with the ink of the present invention to provide an ink set is not particularly limited. In addition, the term "ink set" as used herein includes, of course, an ink tank itself having multiple ink tank portions integrated with each other. Furthermore, the term includes a state where multiple ink tanks different from each other are used together and a state where these ink tanks and a recording head are integrated.

<Ink Jet Recording Method>

The ink according to the present invention is particularly suitably used for an ink jet recording method including ejecting the ink by means of an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by means of the ink according to the present invention includes an ink cartridge including an ink storage portion for storing the ink.

<Recording Unit>

An example of a recording unit suitable for performing recording by means of the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

The recording head in the present invention has a heating portion surface in contact with liquid containing at least a metal and/or a metal oxide. Specific examples of the metal and/or the metal oxide include metals such as Ta, Zr, Ti, and NiAl and oxides of these metals.

<Ink Jet Recording Apparatus>

An example of a recording apparatus suitable for performing recording by means of the ink according to the present invention includes a recording apparatus in which thermal energy corresponding to a recording signal is applied to ink in the chamber of a recording head having an ink storage portion for storing the ink to generate an ink droplet by virtue of the energy.

Hereinafter, the schematic constitution of a mechanism portion of an ink jet recording apparatus will be described. A recording apparatus main body is constituted by a sheet feeding portion, a sheet conveying portion, a carriage portion, a sheet discharge portion, and a cleaning portion, and an external packaging portion for protecting them and providing them with design to achieve a role of each mechanism. Hereinafter, the outline of each of them will be described.

Figure 2:
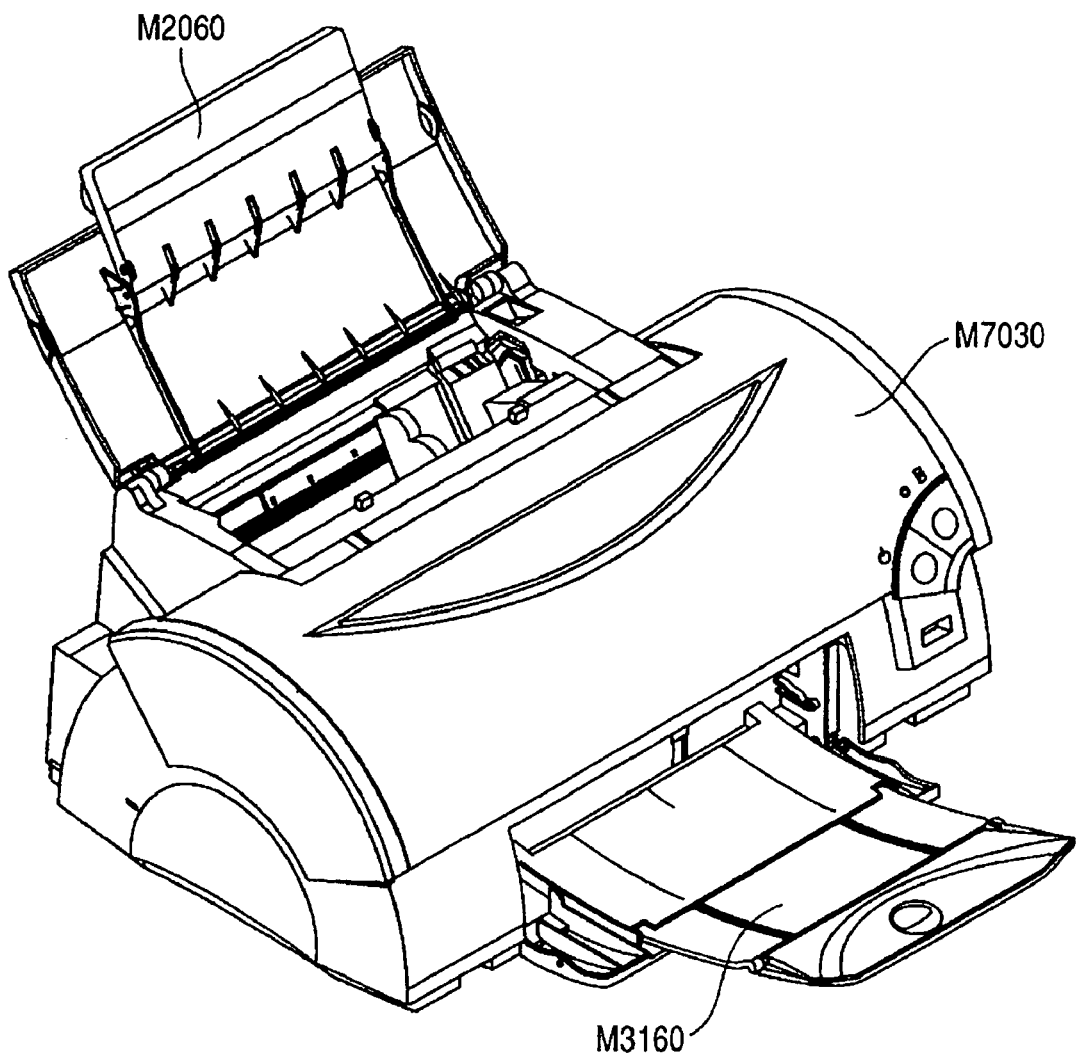
FIG. 2 is a perspective view of a recording apparatus in an embodiment of the present invention.
Figure 3:
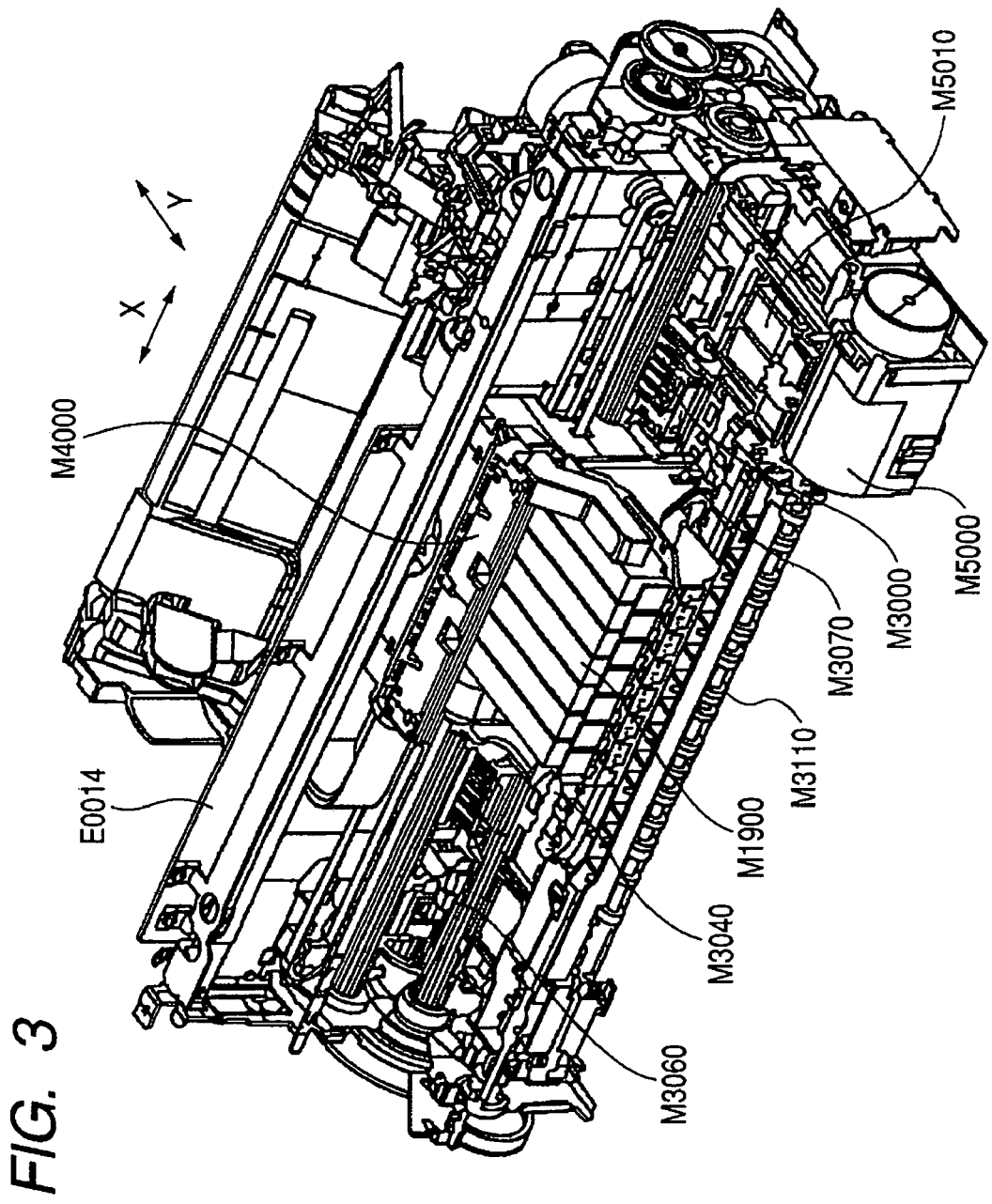
FIG. 3 is a perspective view of a mechanism portion of the recording apparatus in the embodiment of the present invention.
Figure 4:
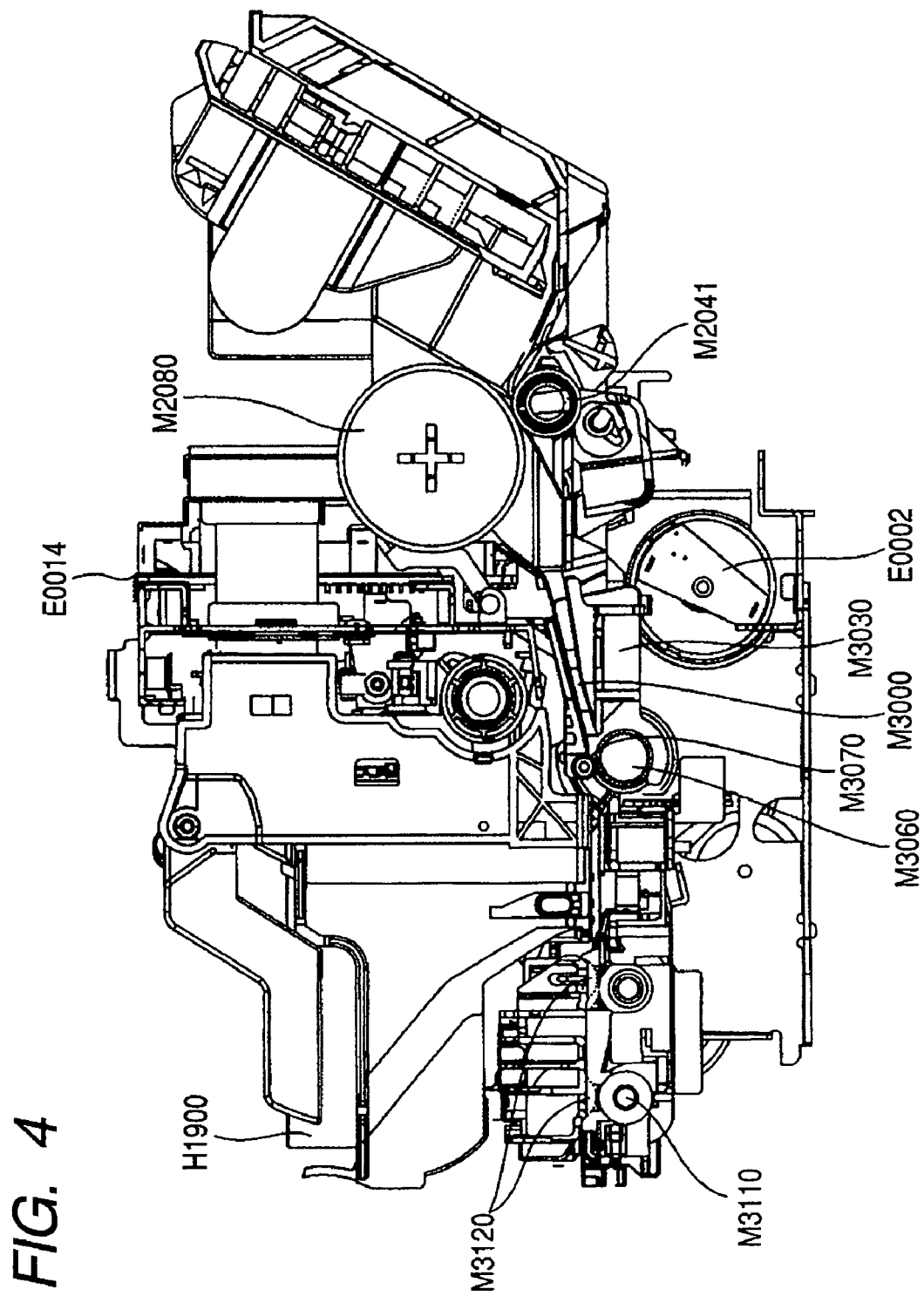
FIG. 4 is a sectional view of the recording apparatus in the embodiment of the present invention.

FIG. 2 is a perspective view of a recording apparatus. FIGS. 3 and 4 are views for explaining the internal mechanism of a recording apparatus main body. FIG. 3 is a perspective view seen from an upper right portion, and FIG. 4 is a side sectional view of the recording apparatus main body.

When a sheet is to be fed in the recording apparatus, only a predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by the driving of an LF motor E0002, and the rotation causes the recording medium to be conveyed on a platen M3040.

In the carriage portion, when an image is to be formed on a recording medium, a recording head H1001 (FIG. 5) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in a column direction and sub scanning in which a recording medium is conveyed in a row direction by the conveying roller M3060 are alternately repeated, whereby an image is formed on the recording medium.

Finally, the recording medium on which an image has been formed is sandwiched at a nip between a first sheet discharge roller M3110 and a spur M3120 in the sheet discharge portion, conveyed, and discharged to a sheet discharge tray M3160.

In the cleaning portion, when a pump M5000 is allowed to act in a state where a cap M5010 is brought into close contact with an ink ejection orifice of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither sticking of the remaining ink nor a subsequent harmful effect occurs.

(Constitution of Recording Head)

The constitution of a head cartridge H1000 will be described. The head cartridge H1000 includes the recording head H1001, means for mounting ink tanks H1900, and means for supplying ink from the ink tanks H1900 to the recording head, and is detachably mounted on the carriage M4000.

Figure 5:
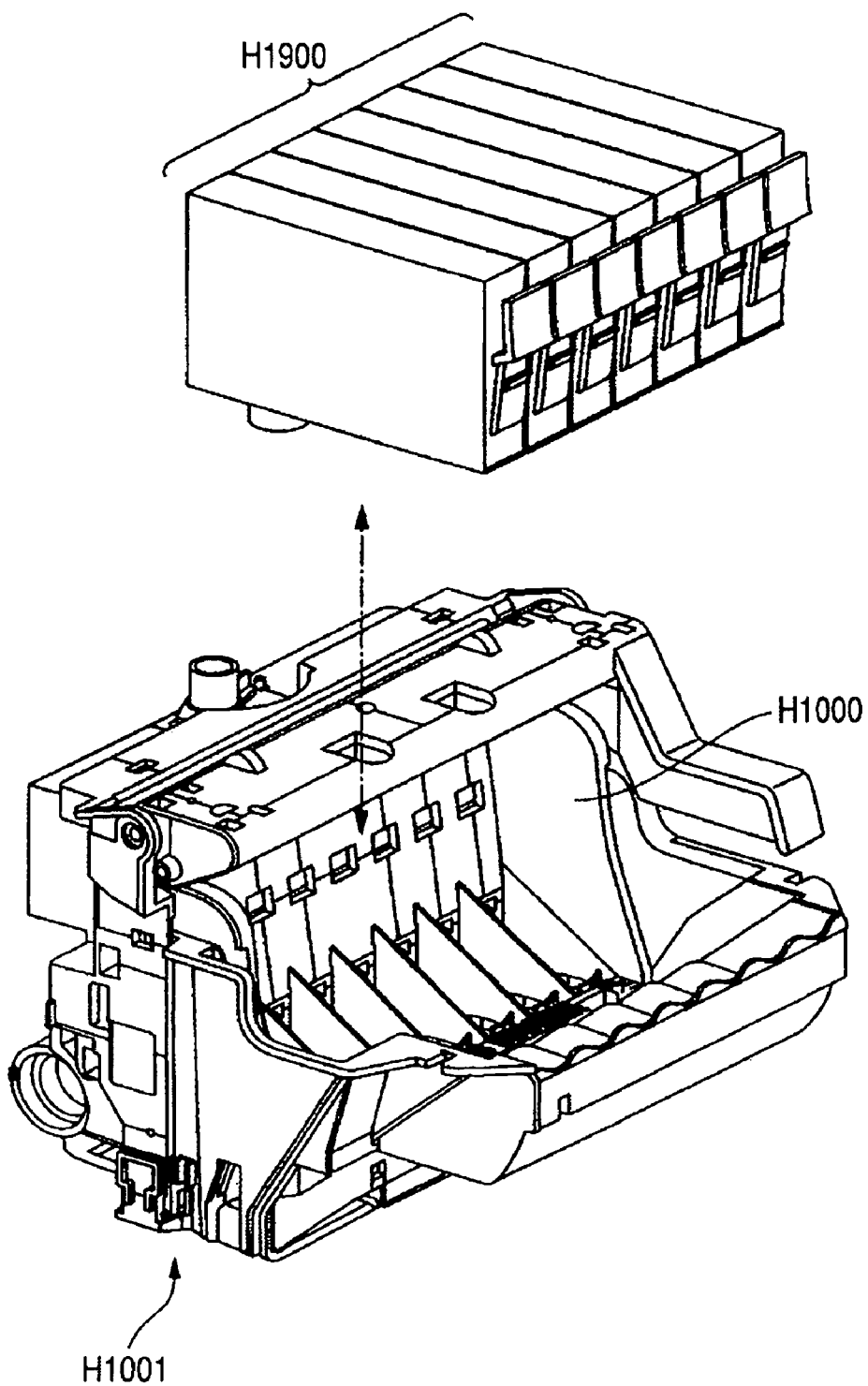
FIG. 5 is a perspective view showing a state where an ink tank is mounted on a head cartridge which is applied to the embodiment of the present invention.

FIG. 5 shows how the ink tanks H1900 are mounted on the head cartridge H1000. The recording apparatus forms an image by means of yellow, magenta, cyan, black, pale magenta, pale cyan, and green inks, so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in a state where the head cartridge H1000 is mounted on the carriage M4000.

Figure 6:
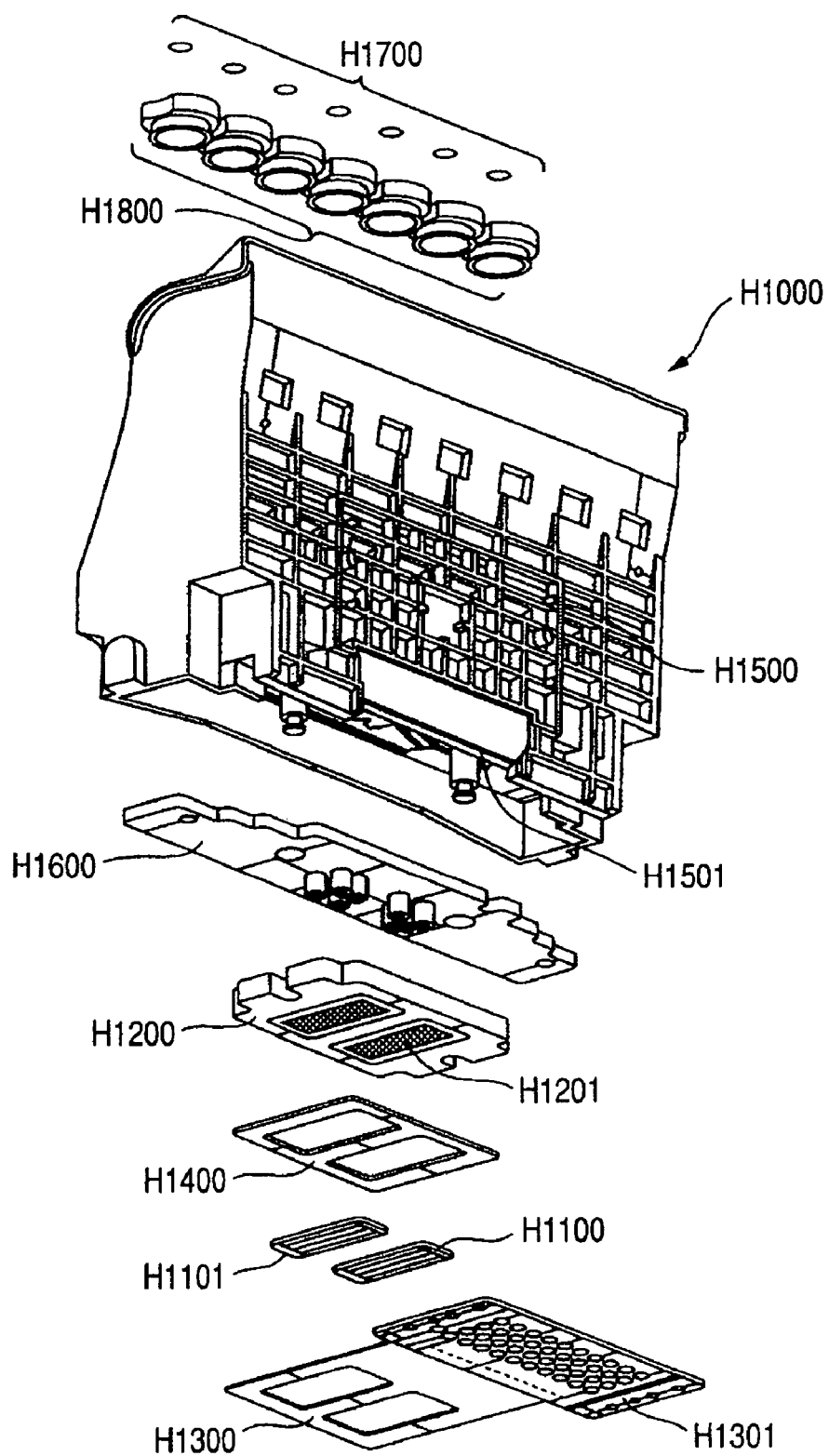
FIG. 6 is an exploded perspective view of the head cartridge which is applied to the embodiment of the present invention.

FIG. 6 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is an Si substrate having multiple recording elements (nozzles) for ejecting ink formed on one surface by means of photolithography. Electric wiring made of Al or the like for supplying power to each recording element is formed by means of a film formation technique, and multiple ink flow paths corresponding to the individual recording elements are also formed by means of photolithography. Furthermore, ink supply orifices for supplying ink to the multiple ink flow paths are formed so as to open on the rear surface.

Figure 7:
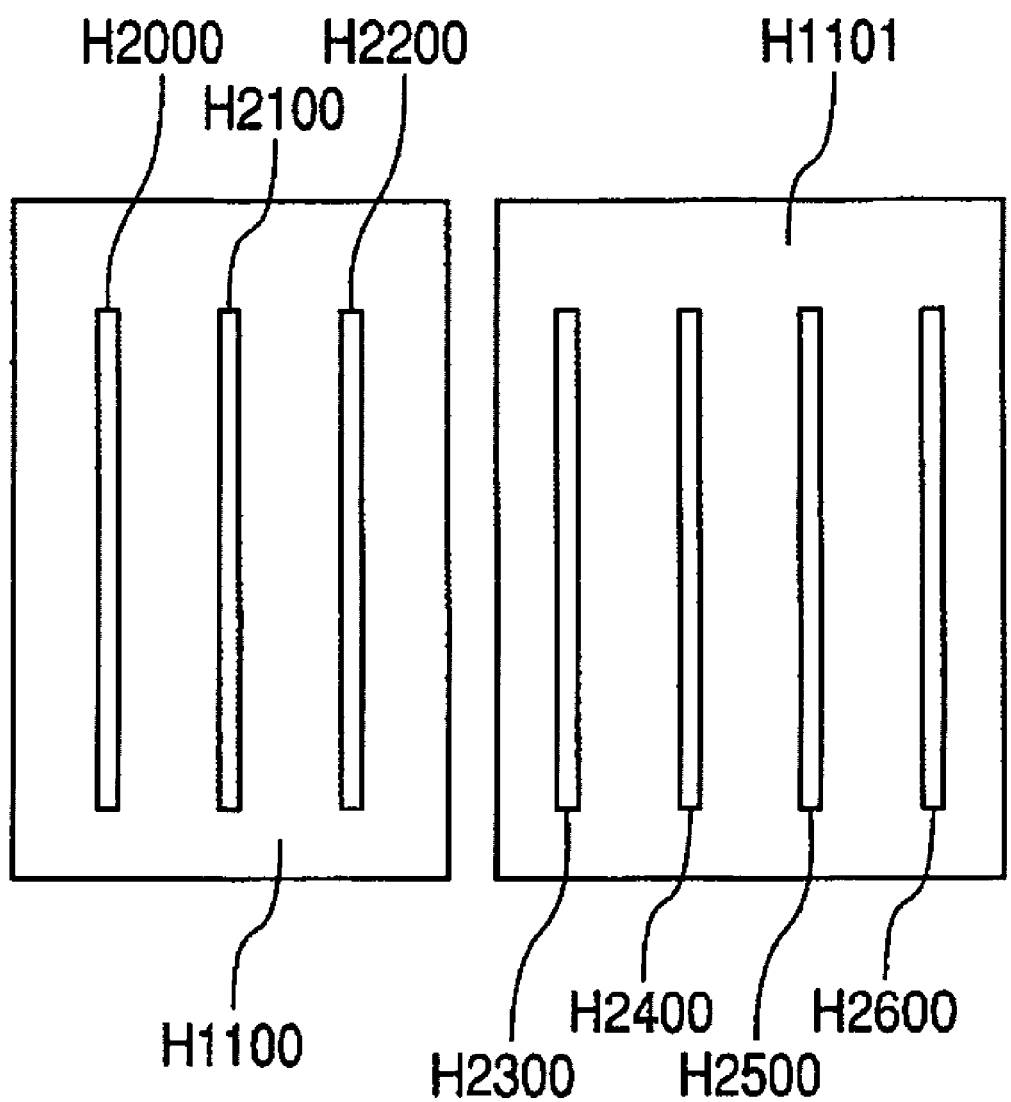
FIG. 7 is a front view showing a recording element substrate in the head cartridge which is applied to the embodiment of the present invention.

FIG. 7 is an enlarged front view for explaining the constitution of each of the first recording element substrate H1100 and the second recording element substrate H1101. Reference symbols H2000 to H2600 denote recording element trains (which may hereinafter be also referred to as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at an interval of 1,200 dpi (dot/inch; reference value) in the direction in which a recording medium is conveyed (hereinafter, referred to as the conveying direction), and each nozzle ejects about 2 pl of ink. An opening area in each nozzle ejection orifice is set to about 100 µm$^2$. The first recording element substrate H1100 and the second recording element substrate H1101 are bonded and fixed to the first plate H1200 having formed thereon ink supply orifices H1201 for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has electric wiring corresponding to each of the first recording element substrate H1100 and the second recording element substrate H1101; and an external signal input terminal H1301 which is positioned at an end portion of the electric wiring to receive an electrical signal from the recording apparatus main body. The external signal input terminal H1301 is positioned and fixed to the back surface side of the tank holder H1500.

Meanwhile, the flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at an end portion on the ink tank side of the ink flow path H1501 engaged with the ink tanks H1900, so the filter H1700 prevents dust from entering from the outside. The seal rubber H1800 is mounted on the portion at which the ink flow path H1501 is engaged with the ink tanks H1900 to prevent ink from evaporating from the engaged portion.

Furthermore, as described above, the head cartridge H1000 is constituted by connecting through bonding or the like a tank holder portion constituted by the tank holder H1500, the flow path forming member H1600, the filter H1700, and the seal rubber H1800, and the recording head portion H1001 constituted by the first recording element substrate H1100, the second recording element substrate H1101, the first plate H1200, the electric wiring substrate H1300, and the second plate H1400.

Description has been made here by taking, as an example of an embodiment of a recording head, a recording head according to a bubble jet (registered trademark) system that performs recording by means of an electrothermal transducer (recording element) for generating thermal energy for causing ink to generate film boiling in accordance with an electrical signal.

The representative structure and principle of a bubble jet system are preferably basic principles disclosed in, for example, descriptions of U.S. Pat. No. 4,723,129 and U.S. Pat. No. 4,740,796. The system is applicable to any one of so-called an on-demand type and a continuous type. In particular, the system is effective for the on-demand type because of the following reason. At least one driving signal which corresponds to recording information and causes a sudden increase in temperature exceeding nuclear boiling is applied to an electrothermal transducer arranged in correspondence with a sheet or liquid flow path holding a liquid (ink), to thereby cause the electrothermal transducer to generate thermal energy. Then, a thermal action surface of a recording head is caused to generate film boiling. As a result, an air bubble in the liquid (ink) can be formed so as to be in one-to-one correspondence with the driving signal. The growth and contraction of the air bubble cause the liquid (ink) to be ejected through an opening for ejection, thereby forming at least one droplet. The driving signal is more preferably of a pulse shape because the growth and contraction of an air bubble can be performed immediately and appropriately, and hence the liquid (ink) can be ejected with excellent responsiveness.

An example of a second embodiment of an ink jet recording apparatus utilizing mechanical energy includes an on-demand ink jet recording head including: a nozzle forming substrate having multiple nozzles; pressure generating means arranged so as to be opposed to the nozzles and composed of a piezoelectric material and a conductive material; and an ink filling the surroundings of the pressure generating means, in which the pressure generating means is displaced by an applied voltage to eject a small ink droplet from a nozzle.

The ink jet recording apparatus is not limited to such apparatus as described above in which a head and an ink tank are separated, and may be one in which a head and an ink tank are integrated so that they are unseparable. The ink tank may be separably or unseparably integrated with the head to be mounted on a carriage, or may be mounted at a fixing portion of an apparatus to supply ink to a recording head through an ink supply member such as a tube. When the ink tank is provided with a constitution for applying a preferable negative pressure to the recording head, an absorber may be arranged in an ink storage portion of the ink tank, or the ink tank may have a flexible ink storage bag and a spring portion for applying bias to expand the internal volume of the bag. The recording apparatus may use a serial recording system as described above, or may be in the form of a line printer obtained by aligning recording elements over the range corresponding to the entire width of a recording medium.

EXAMPLES

Hereinafter, the present invention will be described in more detail by way of examples and comparative examples. However, the present invention is not limited to the following examples without departing from the gist of the present invention. Unless otherwise stated, the term "part" of each ink component in examples and comparative examples represents "part by mass".

(Compound Represented by General Formula (I))

The compound represented by the general formula (I) and a comparative compound used were those commercially available. Table 3 below shows the specific structures of the compound represented by the general formula (I) and the comparative compound to be used in Examples and Comparative Examples. Of course, the present invention is not limited to the compounds shown in Table 3. The compound represented by the general formula (I) was analyzed by means of gel permeation chromatography manufactured by Waters Co. to determine the value for n+m. The analysis conditions for the gel permeation chromatography are as follows.

Column: Shodex (manufactured by SHOWA DENKO K.K.)
Mobile phase: Tetrahydrofuran
Flow rate: 1 mL/min

TABLE 3

| | $R_1$ | $R_2$ | $R_3$ | $R_4$ | $A_1$ | $A_2$ | n + m |
|---|---|---|---|---|---|---|---|
| Compound A | Iso-butyl group | Methyl group | Methyl group | Iso-butyl group | Ethyl group | Ethyl group | 3.5 |
| Compound B | Iso-butyl group | Methyl group | Methyl group | Iso-butyl group | Ethyl group | Ethyl group | 10 |
| Compound C | Iso-butyl group | Methyl group | Methyl group | Iso-butyl group | Ethyl group | Ethyl group | 30 |
| Compound D | Iso-butyl group | Methyl group | Methyl group | Iso-butyl group | Ethyl group | Ethyl group | 40 |

TABLE 3-continued

| | $R_1$ | $R_2$ | $R_3$ | $R_4$ | $A_1$ | $A_2$ | n + m |
|---|---|---|---|---|---|---|---|
| Comparative Compound | Iso-butyl group | Methyl group | Methyl group | Iso-butyl group | — | — | 0 |

(Compound Represented by General Formula (II))

The compound represented by the general formula (II) was that commercially available. Table 4 below shows the specific structure of the compound represented by the general formula (II) to be used in each of Examples and Comparative Examples. Of course, the present invention is not limited to the compounds shown in Table 4. The compound represented by the general formula (II) was analyzed by means of gel permeation chromatography to determine the value for p. The analysis conditions for the gel permeation chromatography were the same as those described above.

TABLE 4

| | $R_5$ | P |
|---|---|---|
| Compound P | H | 8 |
| Compound Q | H | 38 |
| Compound R | H | 4 |
| Compound S | H | 10 |
| Compound T | $C_{16}H_{33}$ | 40 |

(Compound Represented by General Formula (III) or Salt Thereof)

A coloring material having a structure of Exemplified Compound 2 described above was synthesized in accordance with the method described in EP-682 088 A1.

(Preparation of Coloring Material which is a Compound Represented by General Formula (V))

A compound represented by Compound (1) below, sodium carbonate, and ethyl benzoyl acetate were allowed to react with one another in xylene, and the reactant was filtered and washed. To the resultant, were sequentially added m-amino acetanilide, copper acetate, and sodium carbonate in N,N-dimethylformamide to carry out a reaction, and the reactant was filtered and washed. The resultant was sulfonated in fuming sulfuric acid, and the resultant was filtered and washed. The resultant was subjected to a condensation reaction with cyanuric chloride in the presence of sodium hydroxide. Anthranilic acid was added to the reaction liquid to carry out a condensation reaction in the presence of sodium hydroxide. The resultant was filtered and washed to prepare Exemplified Compound A below.

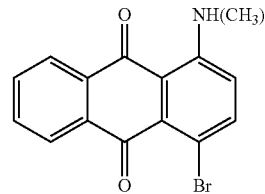

Compound (1)

Exemplified Compound A

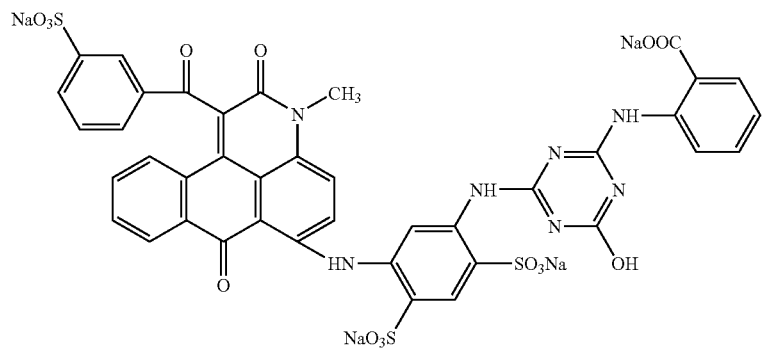

(Preparation of Ink)

The respective components shown in each of Tables 5 and 6 below were mixed and sufficiently stirred. After that, the resultant was filtered through a filter having a pore size of 0.2 μm under pressure to prepare each of inks of Examples 1 to 20 and Comparative Examples 1 to 3.

The pH of each of all the inks of Examples and Comparative Examples was measured to confirm that the pH of the ink was within a buffer region. Exemplified Compound A had a buffer region of pH 6.5 to 11.8 (both inclusive), and the pH of each of the inks of Examples 1 to 8, 10 to 15, and 17 to 20, and Comparative Examples 1 and 2 was within the range. Exemplified Compound 2 had a buffer region of pH 7.3 to 10.5 (both inclusive), and the pH of each of the inks of Examples 9 and 17, and Comparative Example 3 was within the range.

(Evaluation on Print Durability)

A test of print durability for each of the inks thus prepared was performed by means of a pattern obtained by filling the position of magenta ink in an ink jet recording apparatus (trade name: BJ F890; manufactured by CANON Inc.) for ejecting an ink droplet by applying thermal energy to ink; and performing printing on an A4-size recording medium by means of the apparatus at a duty of 100%. The evaluation criteria are as follows. Tables 5 and 6 show the results of the evaluation on print durability.

AA: No inconvenience occurs even after printing has been performed on 20,000 sheets.

A: A blur slightly occurs owing to minute dot mis-alignment after printing has been performed on 15,000 to 19,999 sheets.

B: A blur slightly occurs owing to minute dot mis-alignment after printing has been performed on 10,000 to 14,999 sheets.

C: A blur occurs, or ejection failure occurs owing to disconnection before printing is performed on 10,000 sheets.

AA and A were each judged to cause no problem, B was judged to cause no problem in practical use and to be acceptable, and C was judged to be uacceptable.

TABLE 5

| | | Example | | | | | | | | | Comparative Example | |
|---|---|---|---|---|---|---|---|---|---|---|---|---|
| | | 1 | 2 | 3 | 4 | 5 | 6 | 7 | 8 | 9 | 1 | 2 |
| Glycerin | | 10.00 | 10.00 | 10.00 | 10.00 | 10.00 | 10.00 | 10.00 | 10.00 | 10.00 | 10.00 | 10.00 |
| Ethylene glycol | | 10.00 | 10.00 | 10.00 | 10.00 | 10.00 | 10.00 | 10.00 | 10.00 | 10.00 | 10.00 | 10.00 |
| Compound represented by general formula (I) | Compound A | 1.00 | | | | | | | | | | |
| | Compound B | | 0.25 | 1.00 | 3.00 | 5.00 | | | | 3.00 | | |
| | Compound C | | | | | | 1.00 | 5.00 | | | | |
| | Compound D | | | | | | | | 5.00 | | | |
| Comparative Compound | | | | | | | | | | | | 0.25 |
| Compound represented by general formula (II) | Compound P | | | | | | | | | | | |
| | Compound Q | | | | | | | | | | | |
| | Compound R | | | — | | | | | | | | |
| | Compound S | | | | | | | | | | | |
| | Compound T | | | | | | | | | | | |
| Exemplified Compound 2 | | | | | | | | | | 5.00 | | |
| Exemplified Compound A | | 5.00 | 5.00 | 5.00 | 5.00 | 5.00 | 5.00 | 5.00 | 5.00 | | 5.00 | 5.00 |
| Pure water | | 74.00 | 74.75 | 74.00 | 72.00 | 70.00 | 74.00 | 70.00 | 70.00 | 72.00 | 74.75 | 75.00 |
| Print durability | | A | A | AA | AA | AA | A | AA | A | AA | C | C |

TABLE 6

|  |  | Example | | | | | | | | | | | Comparative Example |
|---|---|---|---|---|---|---|---|---|---|---|---|---|---|
|  |  | 10 | 11 | 12 | 13 | 14 | 15 | 16 | 17 | 18 | 19 | 20 | 3 |
| Glycerin | | 10.00 | 10.00 | 10.00 | 10.00 | 10.00 | 10.00 | 10.00 | 10.00 | 10.00 | 10.00 | 10.00 | 10.00 |
| Ethylene glycol | | 10.00 | 10.00 | 10.00 | 10.00 | 10.00 | 10.00 | 10.00 | 10.00 | 10.00 | 10.00 | 10.00 | 10.00 |
| Compound represented by general formula (I) | Compound A | | | | | | | | | | | | |
| | Compound B | | | | | | | | | | | 1.00 | |
| | Compound C | | | | | | | | | | | | |
| | Compound D | | | | | | | | | | | | |
| Comparative Compound Compound represented by general formula (II) | Compound P | 3.00 | 10.00 | | | | | | 3.00 | 5.00 | | 3.00 | |
| | Compound Q | | | 3.00 | 10.00 | | | | | | | | |
| | Compound R | | | | | 3.00 | 10.00 | | | | | | |
| | Compound S | | | | | | | 10.00 | | | | | |
| | Compound T | | | | | | | | | | 3.00 | | |
| Exemplified Compound 2 | | | | | | | | | 5.00 | 3.00 | | | 5.00 |
| Exemplified Compound A | | 5.00 | 5.00 | 5.00 | 5.00 | 5.00 | 5.00 | 5.00 | | 2.00 | 5.00 | 5.00 | |
| Pure water | | 72.00 | 65.00 | 72.00 | 65.00 | 72.00 | 65.00 | 65.00 | 72.00 | 70.00 | 72.00 | 71.00 | 75.00 |
| Print durability | | AA | AA | AA | AA | A | AA | A | AA | AA | AA | AA | B |

As can be seen from Comparative Example 1, in the case where ink contains a compound different from the compound represented by the general formula (I) and/or the compound represented by the general formula (II), disconnection occurs, with the result that ejection failure occurs. In addition, as can be seen from Comparative Example 2, in the case where ink is free from the compound represented by the general formula (I) and/or the compound represented by the general formula (II), disconnection occurs, with the result that ejection failure occurs. In addition, as can be seen from Example 2, in the case where ink contains the compound represented by the general formula (I), the occurrence of the deterioration of a heating portion surface in contact with liquid; and the disconnection can be suppressed, and no ejection failure occurs. In addition, as can be seen from Example 4, in the case where ink contains the compound represented by the general formula (III) or the salt thereof, and the compound represented by the general formula (I), the occurrence of the deterioration of a heating portion surface in contact with liquid; and the disconnection can be suppressed, and no ejection failure occurs, so a high-quality recorded article can be obtained. In addition, as can be seen from Examples 1 to 8, in the case where ink contains the compound represented by the general formula (V) or the salt thereof, and the compound represented by the general formula (I), the occurrence of the deterioration of a heating portion surface in contact with liquid; and the disconnection can be suppressed, and no ejection failure occurs, so a high-quality recorded article can be obtained.

As can be seen from Examples 1, 2, and 3 to 5, in the case where ink contains the compound represented by the general formula (I), $3 \leq n+m \leq 30$ in the general formula (I), and the content of the compound represented by the general formula (I) is 0.25 mass % or more and 5.0 mass % or less with respect to the total mass of the ink (Examples 3 to 5), the occurrence of the deterioration of a heating portion surface in contact with liquid; and the disconnection can be suppressed more effectively than in the case where ink contains the compound represented by the general formula (I) and the value for n+m and the content are outside the ranges (Examples 1 and 2). In addition, as can be seen from Examples 3 and 4, in the case where ink contains the compound represented by the general formula (I), $5 \leq n+m \leq 15$ in the general formula (I), and the content of the compound represented by the general formula (I) is 1.0 mass % or more and 3.0 mass % or less, the effects in the present invention can be obtained most effectively.

As can be seen from Comparative Example 3, in the case where ink is free from the compound represented by the general formula (I) and/or the compound represented by the general formula (II), disconnection occurs, with the result that ejection failure occurs. In addition, as can be seen from Example 17, in the case where ink contains the compound represented by the general formula (II), the occurrence of the deterioration of a heating portion surface in contact with liquid; and the disconnection can be suppressed, and no ejection failure occurs. In addition, as can be seen from Examples 10 to 13, 14, and 16, in the case where ink contains the compound represented by the general formula (II), $8 \leq p \leq 38$ in the general formula (II), and the content of the compound represented by the general formula (II) is 3.0 mass % or more and 10.0 mass % or less with respect to the total mass of the ink (Examples 10 to 13), the occurrence of the deterioration of a heating portion surface in contact with liquid; and the disconnection can be suppressed more effectively than in the case where ink contains the compound represented by the general formula (II) and the value for p and the content are outside the ranges (Examples 14 and 16). In addition, as can be seen from Example 19, in the case where ink contains a compound in which $R_5$ represents an alkyl group having 16 carbon atoms as the compound represented by the general formula (II), the occurrence of: the deterioration of a heating portion surface in contact with liquid; and the disconnection can be suppressed, and no ejection failure occurs. In addition, as can be seen from Example 20, in the case where ink uses a combination of the compound represented by the general formula (I) and the compound represented by the general formula (II), the occurrence of: the deterioration of a heating portion surface in contact with liquid; and the disconnection can be suppressed, and no ejection failure occurs.

As can be seen from the results of the evaluation on print durability, Comparative Example 2 and Example 4 were evaluated to be C and AA, respectively, while Comparative Example 3 and Example 9 were evaluated to be B and AA, respectively. Similarly, Comparative Example 2 and Example 10 were evaluated to be C and AA, respectively, while Comparative Example 3 and Example 17 were evaluated to be B and AA, respectively. The foregoing reveals that the combined use of at least one of the compound represented by the general formula (I) and the compound represented by the general formula (II) with Exemplified Compound A has larger suppressing effects on the occurrence of the deterioration of a heating portion surface in contact with liquid; and the disconnection than that of the combined use of at least one of them with Exemplified Compound 2. In addition, as can be seen from the results of the evaluation on print durability, Comparative Example 2 and Example 4 were evaluated to be C and AA, respectively, while Comparative Example 3 and Example 9 were evaluated to be B and AA, respectively. Similarly, Comparative Example 2 and Example 10 were evaluated to be C and AA, respectively, while Comparative Example 3 and Example 17 were evaluated to be B and AA, respectively. The foregoing reveals that the combined use of at least one of the compound represented by the general formula (I) and the compound represented by the general formula (II) with Exemplified Compound A has larger suppressing effects on the occurrence of: the deterioration of a heating portion surface in contact with liquid; and the disconnection than that of the combined use of at least one of them with Exemplified Compound 2.

The present application claims the priority of each of Japanese Patent Application No. 2004-196450 filed on the second day of July, 2004 and Japanese Patent Application No. 2005-192193 filed on the thirtieth day of June, 2005, the contents of which are incorporated herein by reference.

This application claims priorities from Japanese Patent Application Nos. 2004-196450 filed on Jul. 2, 2004 and 2005-192193 filed on Jun. 30, 2005, which are incorporated hereinto by reference.

What is claimed is:

1. An ink jet ink to be used for an ink jet recording apparatus equipped with a recording head having a heating portion surface in contact with liquid comprising at least a metal and/or a metal oxide, comprising a coloring material in a content (mass %) of 3 mass % or more with respect to a total mass of the ink jet ink, wherein the coloring material comprises a compound represented by the following general formula (V) or a salt thereof, and wherein the ink further comprises at least a compound represented by the following general formula (I) and/or a compound represented by the following general formula (II)

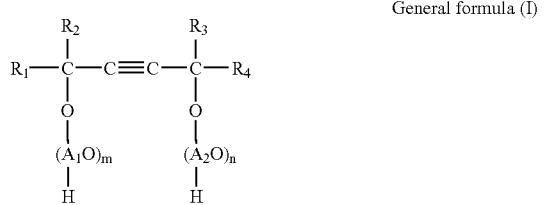

General formula (I)

wherein $R_1$, $R_2$, $R_3$, and $R_4$ each independently represent an alkyl group having 1 to 6 carbon atoms which may be branched; $A_1O$ and $A_2O$ each independently represent an ethylene oxide group, a propylene oxide group, or a copolymerized structure of an ethylene oxide group and a propylene oxide group; and m and n each independently represent an integer more than 0,

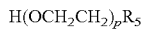

General formula (II)

wherein $R_5$ represents a hydroxyl group or an alkyl group having 4 or more carbon atoms which may be branched; and p represents an integer of 4 or more,

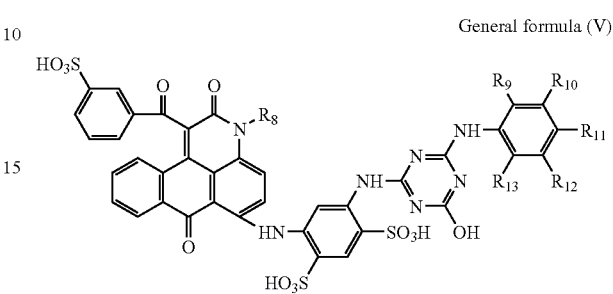

General formula (V)

wherein $R_8$ represents a hydrogen atom, an alkyl group, a hydroxy lower alkyl group, a cyclohexyl group, a monoalkylaminoalkyl or dialkylaminoalkyl group, or a cyano lower alkyl group; and $R_9$, $R_{10}$, $R_{11}$, $R_{12}$, and $R_{13}$ each independently represent a hydrogen atom, an alkyl group having 1 to 8 carbon atoms, or a carboxyl group provided that $R_9$, $R_{10}$, $R_{11}$, $R_{12}$, and $R_{13}$ cannot simultaneously represent hydrogen atoms.

2. An ink jet ink according to claim 1, wherein $3 \leq n+m \leq 30$ in the general formula (I); and the content (mass %) of the compound represented by the general formula (I) is 0.25 mass % or more and 5.0 mass % or less with respect to the total mass of the ink jet ink.

3. An ink jet ink according to claim 1, wherein $4 \leq p \leq 38$ in the general formula (II); and the content (mass %) of the compound represented by the general formula (II) is 3.0 mass % or more and 10.0 mass % or less with respect to the total mass of the ink jet ink.

4. An ink jet recording method, comprising ejecting an ink by an ink jet method, wherein the ink comprises the ink jet ink according to claim 1.

5. An ink jet recording method according to claim 4, comprising applying thermal energy to an ink to eject the ink.

6. An ink cartridge, comprising an ink storage portion for storing ink, wherein the ink comprises the ink jet ink according to claim 1.

7. A recording unit, comprising an ink storage portion for storing ink and a recording head for ejecting the ink, wherein the ink comprises the ink jet ink according to claim 1.

8. An ink jet recording apparatus, comprising an ink storage portion for storing ink and a recording head for ejecting the ink, wherein the ink comprises the ink jet ink according to claim 1.

9. An ink jet ink according to claim 1, wherein the content (mass %) of the coloring material in the ink jet ink is 5.0 mass % or more to 10.0 mass % or less with respect to the total mass of the ink.

* * * * *

UNITED STATES PATENT AND TRADEMARK OFFICE
CERTIFICATE OF CORRECTION

PATENT NO. : 7,294,184 B2 Page 1 of 1
APPLICATION NO. : 11/321552
DATED : November 13, 2007
INVENTOR(S) : Kuniaki Fujimoto et al.

It is certified that error appears in the above-identified patent and that said Letters Patent is hereby corrected as shown below:

ON THE TITLE PAGE At (75), INVENTORS:

"Kuniaki Fujimoto, Tokyo (JP)" should read --Kuniaki Fujimoto, Chofu (JP)--.
"Shin-ichi Sato, Kanagawa (JP)" should read --Shin-ichi Sato, Kawasaki (JP)--.
"Yoshihide Aikawa, Kanagawa (JP)" should read --Yoshihide Aikawa, Yokohama (JP)--.
"Kunihiko Nakamura, Shizuoka (JP)" should read --Kunihiko Nakamura, Gotemba (JP)--.
"Masanori Jinnou, Kanagawa (JP)" should read --Masanori Jinnou, Yokohama (JP)--.

COLUMN 2:
Line 17, "a" should read --an--.
Line 58, "Another" should read --Other--.

COLUMN 19:
Line 9, "litters" should read --liters--.

Signed and Sealed this

Sixteenth Day of December, 2008

JON W. DUDAS
*Director of the United States Patent and Trademark Office*